(12) United States Patent
Dutta

(10) Patent No.: US 12,381,815 B2
(45) Date of Patent: Aug. 5, 2025

(54) SEQUENCING OF LABELED PACKETS

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 515 days.

(21) Appl. No.: 17/701,982

(22) Filed: Mar. 23, 2022

(65) Prior Publication Data

US 2023/0308387 A1 Sep. 28, 2023

(51) Int. Cl.
*H04L 45/50* (2022.01)
*H04L 47/34* (2022.01)

(52) U.S. Cl.
CPC ............ *H04L 45/50* (2013.01); *H04L 47/34* (2013.01)

(58) Field of Classification Search
CPC ..... H04L 45/50; H04L 47/34; H04L 12/4633; H04L 12/4641; H04L 45/16
See application file for complete search history.

(56) References Cited

U.S. PATENT DOCUMENTS

| | | | | |
|---|---|---|---|---|
| 10,397,101 | B1* | 8/2019 | Morris | H04L 61/4511 |
| 2017/0366461 | A1* | 12/2017 | Wu | H04L 45/50 |
| 2018/0367450 | A1* | 12/2018 | Sitaraman | H04L 45/50 |
| 2020/0358698 | A1* | 11/2020 | Song | H04L 45/50 |
| 2021/0067441 | A1* | 3/2021 | Hari | H04L 49/25 |
| 2021/0243111 | A1 | 8/2021 | Dutta | |
| 2022/0345985 | A1* | 10/2022 | Erta | H04L 45/50 |
| 2023/0239217 | A1* | 7/2023 | Bashandy | H04L 41/12 370/392 |

FOREIGN PATENT DOCUMENTS

JP 2005130258 A 5/2005

OTHER PUBLICATIONS

Bryant, S., et al., "Pseudowire Emulation Edge-to-Edge (PWE3) Control Word for Use over an MPLS PSN," Network Working Group, RFC 4385, Feb. 2006, 12 pages.
Extended EP Search Report, Application No. 23157826.1, Jul. 13, 2023, 6 pages.

* cited by examiner

*Primary Examiner* — Donald L Mills
(74) *Attorney, Agent, or Firm* — Tong, Rea, Bentley & Kim, LLC

(57) ABSTRACT

Various example embodiments for supporting sequencing of labeled packets are presented herein. Various example embodiments for supporting sequencing of labeled packets may be configured to support sequencing of labeled packet based on use of a multiprotocol label switching sequence header. Various example embodiments for supporting sequencing of labeled packets may be configured to support sequencing of labeled packet based on use of a multiprotocol label switching sequence header that includes a source identifier of a source of a multiprotocol label switching packet sequence including the multiprotocol label switching packet, a sequence identifier of the multiprotocol label switching packet sequence, and a sequence number of the multiprotocol label switching packet. Various example embodiments for supporting sequencing of labeled packets may be configured to support sequencing of Multiprotocol Label Switching (MPLS) packets.

13 Claims, 22 Drawing Sheets

*FIG. 7*

```
                                                      LABEL SWITCHED
                                                         PACKET
                                                           700

0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    //                                                              //
    //                           Payload                            //
    +-+-+-+-+-+-+-+-+-+-+-+-+-+-+-+-+-+-+-+-+-+-+-+-+-+-+-+-+-+-+-+-+
    //                     MPLS Label Stack LSP 2                   //
    //                                                              //
    +-+-+-+-+-+-+-+-+-+-+-+-+-+-+-+-+-+-+-+-+-+-+-+-+-+-+-+-+-+-+-+-+  ~
    |                     Sequence Number           |    Flags      |  |
    +-+-+-+-+-+-+-+-+-+-+-+-+-+-+-+-+-+-+-+-+-+-+-+-+-+-+-+-+-+-+-+-+  |
    |                          Sequence ID                          |  |
    +-+-+-+-+-+-+-+-+-+-+-+-+-+-+-+-+-+-+-+-+-+-+-+-+-+-+-+-+-+-+-+-+  |
    |                          Source ID                            |  |
    +-+-+-+-+-+-+-+-+-+-+-+-+-+-+-+-+-+-+-+-+-+-+-+-+-+-+-+-+-+-+-+-+  |
    |           MSI            |          Exp  |S|     TTL           |  |
    +-+-+-+-+-+-+-+-+-+-+-+-+-+-+-+-+-+-+-+-+-+-+-+-+-+-+-+-+-+-+-+-+  ~
    //                     MPLS Label Stack LSP 1                   //
    //                                                              //
    +-+-+-+-+-+-+-+-+-+-+-+-+-+-+-+-+-+-+-+-+-+-+-+-+-+-+-+-+-+-+-+-+

MPLS
                                                    SEQUENCE
                                                     HEADER
```

SEQUENCING OF LABELED PACKETS

TECHNICAL FIELD

Various example embodiments relate generally to communication systems and, more particularly but not exclusively, to communications systems supporting communications based on labeled packets.

BACKGROUND

In communication systems, various communication capabilities may be configured to support various types of communications.

SUMMARY

In at least some example embodiments, an apparatus includes at least one processor and at least one memory including computer program code, wherein the at least one memory and the computer program code are configured to, with the at least one processor, cause the apparatus to at least support communication of a multiprotocol label switching packet including a multiprotocol label switching sequence header, wherein the multiprotocol label switching sequence header includes a source identifier of a source of a multiprotocol label switching packet sequence including the multiprotocol label switching packet, a sequence identifier of the multiprotocol label switching packet sequence, and a sequence number of the multiprotocol label switching packet. In at least some example embodiments, a combination of the source identifier and the sequence identifier is configured to uniquely identify the multiprotocol label switching packet sequence within a network. In at least some example embodiments, the source identifier of the source includes one of an internet protocol address or a media access control address. In at least some example embodiments, the multiprotocol label switching sequence header is disposed between a payload of the multiprotocol label switching packet and label stack of the multiprotocol label switching packet. In at least some example embodiments, the label stack of the multiprotocol label switching packet represents a multiprotocol label switching label switched path or a multiprotocol label switching point-to-multipoint label switched path. In at least some example embodiments, the multiprotocol label switching sequence header is disposed between a first label stack of the multiprotocol label switching packet and a second label stack of the multiprotocol label switching packet. In at least some example embodiments, the first label stack of the multiprotocol label switching packet is disposed above the multiprotocol label switching sequence header and the second label stack of the multiprotocol label switching packet is disposed below the multiprotocol label switching sequence header. In at least some example embodiments, the multiprotocol label switching sequence header includes a flag indicative of a presence of the second label stack of the multiprotocol label switching below the multiprotocol label switching sequence header. In at least some example embodiments, the first label stack of the multiprotocol label switching packet represents a multiprotocol label switching label switched path. In at least some example embodiments, the second label stack of the multiprotocol label switching packet represents a virtual private network or a pseudowire. In at least some example embodiments, the multiprotocol label switching packet includes a second multiprotocol label switching sequence header. In at least some example embodiments, the multiprotocol label switching packet includes a first label stack associated with the multiprotocol label switching sequence header, wherein the multiprotocol label switching packet includes a second label stack associated with the second multiprotocol label switching sequence header. In at least some example embodiments, the multiprotocol label switching sequence header is encapsulated by a sequence indicator label configured to indicate presence of the multiprotocol label switching sequence header in the multiprotocol label switching packet. In at least some example embodiments, to support communication of the multiprotocol label switching packet, the at least one memory and the computer program code are configured to, with the at least one processor, cause the apparatus at least to generate, by the source of the multiprotocol label switching packet sequence, the multiprotocol label switching packet and send, by the source of the multiprotocol label switching packet sequence toward a next hop, the multiprotocol label switching packet. In at least some example embodiments, to support communication of the multiprotocol label switching packet, the at least one memory and the computer program code are configured to, with the at least one processor, cause the apparatus at least to receive, by an egress node of the multiprotocol label switching packet sequence, the multiprotocol label switching packet. In at least some example embodiments, the at least one memory and the computer program code are configured to, with the at least one processor, cause the apparatus at least to determine, based on the multiprotocol label switching sequence header, a location of the multiprotocol label switching packet within the multiprotocol label switching packet sequence. In at least some example embodiments, the at least one memory and the computer program code are configured to, with the at least one processor, cause the apparatus at least to determine, based on the multiprotocol label switching sequence header, whether the multiprotocol label switching packet is a duplicate packet of the multiprotocol label switching packet sequence. In at least some example embodiments, the at least one memory and the computer program code are configured to, with the at least one processor, cause the apparatus at least to enqueue the multiprotocol label switching packet in a queue indexed by a combination of the source identifier and the sequence identifier and sorted based on the sequence number. In at least some example embodiments, the at least one memory and the computer program code are configured to, with the at least one processor, cause the apparatus at least to forward the multiprotocol label switching packet sequence from the queue based on a determination that the multiprotocol label switching packet sequence is enqueued within the queue. In at least some example embodiments, the at least one memory and the computer program code are configured to, with the at least one processor, cause the apparatus at least to maintain, for the queue, a maximum sequence number of a multiprotocol label switching packet sequence last flushed from the queue and identify the multiprotocol label switching packet as a duplicate packet based on a determination that the sequence number of the multiprotocol label switching packet is less than the maximum sequence number of the multiprotocol label switching packet sequence last flushed from the queue. In at least some example embodiments, the at least one memory and the computer program code are configured to, with the at least one processor, cause the apparatus at least to identify the multiprotocol label switching packet as a duplicate packet based on a determination that the sequence number of the multiprotocol label switching packet matches a sequence number of an existing multiprotocol label switching packet enqueued in the queue.

In at least some example embodiments, a non-transitory computer-readable medium stores computer program code configured to cause an apparatus to support communication of a multiprotocol label switching packet including a multiprotocol label switching sequence header, wherein the multiprotocol label switching sequence header includes a source identifier of a source of a multiprotocol label switching packet sequence including the multiprotocol label switching packet, a sequence identifier of the multiprotocol label switching packet sequence, and a sequence number of the multiprotocol label switching packet. In at least some example embodiments, a combination of the source identifier and the sequence identifier is configured to uniquely identify the multiprotocol label switching packet sequence within a network. In at least some example embodiments, the source identifier of the source includes one of an internet protocol address or a media access control address. In at least some example embodiments, the multiprotocol label switching sequence header is disposed between a payload of the multiprotocol label switching packet and label stack of the multiprotocol label switching packet. In at least some example embodiments, the label stack of the multiprotocol label switching packet represents a multiprotocol label switching label switched path or a multiprotocol label switching point-to-multipoint label switched path. In at least some example embodiments, the multiprotocol label switching sequence header is disposed between a first label stack of the multiprotocol label switching packet and a second label stack of the multiprotocol label switching packet. In at least some example embodiments, the first label stack of the multiprotocol label switching packet is disposed above the multiprotocol label switching sequence header and the second label stack of the multiprotocol label switching packet is disposed below the multiprotocol label switching sequence header. In at least some example embodiments, the multiprotocol label switching sequence header includes a flag indicative of a presence of the second label stack of the multiprotocol label switching below the multiprotocol label switching sequence header. In at least some example embodiments, the first label stack of the multiprotocol label switching packet represents a multiprotocol label switching label switched path. In at least some example embodiments, the second label stack of the multiprotocol label switching packet represents a virtual private network or a pseudowire. In at least some example embodiments, the multiprotocol label switching packet includes a second multiprotocol label switching sequence header. In at least some example embodiments, the multiprotocol label switching packet includes a first label stack associated with the multiprotocol label switching sequence header, wherein the multiprotocol label switching packet includes a second label stack associated with the second multiprotocol label switching sequence header. In at least some example embodiments, the multiprotocol label switching sequence header is encapsulated by a sequence indicator label configured to indicate presence of the multiprotocol label switching sequence header in the multiprotocol label switching packet. In at least some example embodiments, to support communication of the multiprotocol label switching packet, the computer program code is configured to cause the apparatus at least to generate, by the source of the multiprotocol label switching packet sequence, the multiprotocol label switching packet and send, by the source of the multiprotocol label switching packet sequence toward a next hop, the multiprotocol label switching packet. In at least some example embodiments, to support communication of the multiprotocol label switching packet, the computer program code is configured to cause the apparatus at least to receive, by an egress node of the multiprotocol label switching packet sequence, the multiprotocol label switching packet. In at least some example embodiments, the computer program code is configured to cause the apparatus at least to determine, based on the multiprotocol label switching sequence header, a location of the multiprotocol label switching packet within the multiprotocol label switching packet sequence. In at least some example embodiments, the computer program code is configured to cause the apparatus at least to determine, based on the multiprotocol label switching sequence header, whether the multiprotocol label switching packet is a duplicate packet of the multiprotocol label switching packet sequence. In at least some example embodiments, the computer program code is configured to cause the apparatus at least to enqueue the multiprotocol label switching packet in a queue indexed by a combination of the source identifier and the sequence identifier and sorted based on the sequence number. In at least some example embodiments, the computer program code is configured to cause the apparatus at least to forward the multiprotocol label switching packet sequence from the queue based on a determination that the multiprotocol label switching packet sequence is enqueued within the queue. In at least some example embodiments, the computer program code is configured to cause the apparatus at least to maintain, for the queue, a maximum sequence number of a multiprotocol label switching packet sequence last flushed from the queue and identify the multiprotocol label switching packet as a duplicate packet based on a determination that the sequence number of the multiprotocol label switching packet is less than the maximum sequence number of the multiprotocol label switching packet sequence last flushed from the queue. In at least some example embodiments, the computer program code is configured to cause the apparatus at least to identify the multiprotocol label switching packet as a duplicate packet based on a determination that the sequence number of the multiprotocol label switching packet matches a sequence number of an existing multiprotocol label switching packet enqueued in the queue.

In at least some example embodiments, a method includes supporting communication of a multiprotocol label switching packet including a multiprotocol label switching sequence header, wherein the multiprotocol label switching sequence header includes a source identifier of a source of a multiprotocol label switching packet sequence including the multiprotocol label switching packet, a sequence identifier of the multiprotocol label switching packet sequence, and a sequence number of the multiprotocol label switching packet. In at least some example embodiments, a combination of the source identifier and the sequence identifier is configured to uniquely identify the multiprotocol label switching packet sequence within a network. In at least some example embodiments, the source identifier of the source includes one of an internet protocol address or a media access control address. In at least some example embodiments, the multiprotocol label switching sequence header is disposed between a payload of the multiprotocol label switching packet and label stack of the multiprotocol label switching packet. In at least some example embodiments, the label stack of the multiprotocol label switching packet represents a multiprotocol label switching label switched path or a multiprotocol label switching point-to-multipoint label switched path. In at least some example embodiments, the multiprotocol label switching sequence header is disposed between a first label stack of the multiprotocol label switching packet and a second label stack of the multiprotocol label switching packet. In at least some example embodiments, the first label stack of the multiprotocol label switching packet is disposed above the multiprotocol label switching sequence header and the second label stack of the multiprotocol label switching packet is disposed below the multiprotocol label switching sequence header. In at least some example embodiments, the multiprotocol label switching sequence header includes a flag indicative of a presence of the second label stack of the multiprotocol label switching below the multiprotocol label switching sequence header. In at least some example embodiments, the first label stack of the multiprotocol label switching packet represents a multiprotocol label switching label switched path. In at least some example embodiments, the second label stack of the multiprotocol label switching packet represents a virtual private network or a pseudowire. In at least some example embodiments, the multiprotocol label switching packet includes a second multiprotocol label switching sequence header. In at least some example embodiments, the multiprotocol label switching packet includes a first label stack associated with the multiprotocol label switching sequence header, wherein the multiprotocol label switching packet includes a second label stack associated with the second multiprotocol label switching sequence header. In at least some example embodiments, the multiprotocol label switching sequence header is encapsulated by a sequence indicator label configured to indicate presence of the multiprotocol label switching sequence header in the multiprotocol label switching packet. In at least some example embodiments, supporting communication of the multiprotocol label switching packet includes generating, by the source of the multiprotocol label switching packet sequence, the multiprotocol label switching packet and sending, by the source of the multiprotocol label switching packet sequence toward a next hop, the multiprotocol label switching packet. In at least some example embodiments, supporting communication of the multiprotocol label switching packet includes receiving, by an egress node of the multiprotocol label switching packet sequence, the multiprotocol label switching packet. In at least some example embodiments, the method includes determining, based on the multiprotocol label switching sequence header, a location of the multiprotocol label switching packet within the multiprotocol label switching packet sequence. In at least some example embodiments, the method includes determining, based on the multiprotocol label switching sequence header, whether the multiprotocol label switching packet is a duplicate packet of the multiprotocol label switching packet sequence. In at least some example embodiments, the method includes enqueuing the multiprotocol label switching packet in a queue indexed by a combination of the source identifier and the sequence identifier and sorted based on the sequence number. In at least some example embodiments, the method includes forwarding the multiprotocol label switching packet sequence from the queue based on a determination that the multiprotocol label switching packet sequence is enqueued within the queue. In at least some example embodiments, the method includes maintaining, for the queue, a maximum sequence number of a multiprotocol label switching packet sequence last flushed from the queue and identifying the multiprotocol label switching packet as a duplicate packet based on a determination that the sequence number of the multiprotocol label switching packet is less than the maximum sequence number of the multiprotocol label switching packet sequence last flushed from the queue. In at least some example embodiments, the method includes identifying the multiprotocol label switching packet as a duplicate packet based on a determination that the sequence number of the multiprotocol label switching packet matches a sequence number of an existing multiprotocol label switching packet enqueued in the queue.

In at least some example embodiments, an apparatus includes means for supporting communication of a multiprotocol label switching packet including a multiprotocol label switching sequence header, wherein the multiprotocol label switching sequence header includes a source identifier of a source of a multiprotocol label switching packet sequence including the multiprotocol label switching packet, a sequence identifier of the multiprotocol label switching packet sequence, and a sequence number of the multiprotocol label switching packet. In at least some example embodiments, a combination of the source identifier and the sequence identifier is configured to uniquely identify the multiprotocol label switching packet sequence within a network. In at least some example embodiments, the source identifier of the source includes one of an internet protocol address or a media access control address. In at least some example embodiments, the multiprotocol label switching sequence header is disposed between a payload of the multiprotocol label switching packet and label stack of the multiprotocol label switching packet. In at least some example embodiments, the label stack of the multiprotocol label switching packet represents a multiprotocol label switching label switched path or a multiprotocol label switching point-to-multipoint label switched path. In at least some example embodiments, the multiprotocol label switching sequence header is disposed between a first label stack of the multiprotocol label switching packet and a second label stack of the multiprotocol label switching packet. In at least some example embodiments, the first label stack of the multiprotocol label switching packet is disposed above the multiprotocol label switching sequence header and the second label stack of the multiprotocol label switching packet is disposed below the multiprotocol label switching sequence header. In at least some example embodiments, the multiprotocol label switching sequence header includes a flag indicative of a presence of the second label stack of the multiprotocol label switching below the multiprotocol label switching sequence header. In at least some example embodiments, the first label stack of the multiprotocol label switching packet represents a multiprotocol label switching label switched path. In at least some example embodiments, the second label stack of the multiprotocol label switching packet represents a virtual private network or a pseudowire. In at least some example embodiments, the multiprotocol label switching packet includes a second multiprotocol label switching sequence header. In at least some example embodiments, the multiprotocol label switching packet includes a first label stack associated with the multiprotocol label switching sequence header, wherein the multiprotocol label switching packet includes a second label stack associated with the second multiprotocol label switching sequence header. In at least some example embodiments, the multiprotocol label switching sequence header is encapsulated by a sequence indicator label configured to indicate presence of the multiprotocol label switching sequence header in the multiprotocol label switching packet. In at least some example embodiments, the means for supporting communication of the multiprotocol label switching packet includes means for generating, by the source of the multiprotocol label switching packet sequence, the multiprotocol label switching packet and means for sending, by the source of the multiprotocol label switching packet sequence toward a next hop, the multiprotocol label switching packet. In at least some example embodiments, the means for supporting communication of the multiprotocol label switching packet includes means for receiving, by an egress node of the multiprotocol label switching packet sequence, the multiprotocol label switching packet. In at least some example embodiments, the apparatus includes means for determining, based on the multiprotocol label switching sequence header, a location of the multiprotocol label switching packet within the multiprotocol label switching packet sequence. In at least some example embodiments, the apparatus includes means for determining, based on the multiprotocol label switching sequence header, whether the multiprotocol label switching packet is a duplicate packet of the multiprotocol label switching packet sequence. In at least some example embodiments, the apparatus includes means for enqueuing the multiprotocol label switching packet in a queue indexed by a combination of the source identifier and the sequence identifier and sorted based on the sequence number. In at least some example embodiments, the apparatus includes means for forwarding the multiprotocol label switching packet sequence from the queue based on a determination that the multiprotocol label switching packet sequence is enqueued within the queue. In at least some example embodiments, the apparatus includes means for maintaining, for the queue, a maximum sequence number of a multiprotocol label switching packet sequence last flushed from the queue and means for identifying the multiprotocol label switching packet as a duplicate packet based on a determination that the sequence number of the multiprotocol label switching packet is less than the maximum sequence number of the multiprotocol label switching packet sequence last flushed from the queue. In at least some example embodiments, the apparatus includes means for identifying the multiprotocol label switching packet as a duplicate packet based on a determination that the sequence number of the multiprotocol label switching packet matches a sequence number of an existing multiprotocol label switching packet enqueued in the queue.

BRIEF DESCRIPTION OF THE DRAWINGS

The teachings herein can be readily understood by considering the following detailed description in conjunction with the accompanying drawings, in which:

FIG. 7 depicts an example embodiment of an encoding of an MPLS Sequence Header in an LSP hierarchy in a label switched packet;

To facilitate understanding, identical reference numerals have been used herein, wherever possible, in order to designate identical elements that are common among the various figures.

DETAILED DESCRIPTION

Various example embodiments for supporting sequencing of labeled packets are presented herein. Various example embodiments for supporting sequencing of labeled packets may be configured to support sequencing of labeled packet based on use of a multiprotocol label switching sequence header. Various example embodiments for supporting sequencing of labeled packets may be configured to support sequencing of labeled packet based on use of a multiprotocol label switching sequence header that includes a source identifier of a source of a multiprotocol label switching packet sequence including the multiprotocol label switching packet, a sequence identifier of the multiprotocol label switching packet sequence, and a sequence number of the multiprotocol label switching packet. Various example embodiments for supporting sequencing of labeled packets may be configured to support sequencing of Multiprotocol Label Switching (MPLS) packets. It will be appreciated that these and various other example embodiments and advantages or potential advantages of supporting sequencing of labeled packets may be further understood by way of reference to the various figures, which are discussed further below.

Figure 1:
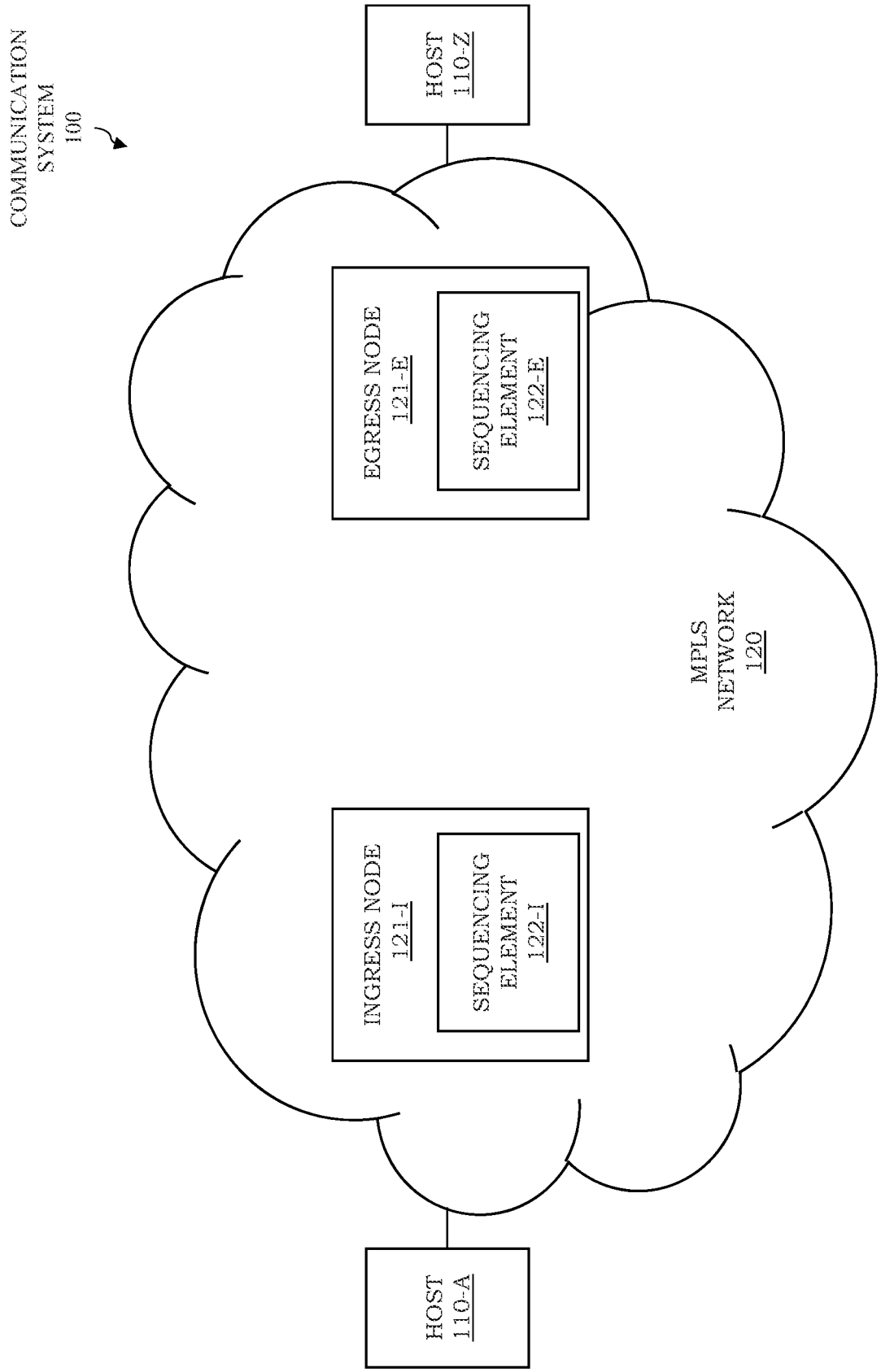
FIG. 1 depicts an example embodiment of a communication system configured to support sequencing of Multiprotocol Label Switching (MPLS) packets.

FIG. 1 depicts an example embodiment of a communication system configured to support sequencing of Multiprotocol Label Switching (MPLS) packets.

In FIG. 1, the communication system 100 includes a pair of hosts 110 (illustratively, host 110-A and host 110-Z) and an MPLS network 120 configured to support communications of the hosts 110. The MPLS network 120 includes a set of nodes 121 (illustratively, for purposes of clarity, only ingress node 121-I and egress node 121-E associated with host 110-A and host 110-Z, respectively, are depicted; however, it will be appreciated that the MPLS network 120 may include various other nodes configured to support communications within the MPLS network 120). It will be appreciated that the communication system 100 may include various other numbers, types, and/or arrangements of elements.

The hosts 110 may include any hosts which may communicate over the MPLS network 120, which may include end user hosts (e.g., end user devices such as smartphones, computers, or the like), network hosts (e.g., network elements configured to support communications of customers), or the like, as well as various combinations thereof. In other words, the hosts 110 may represent any sources of traffic which may be transported over an MPLS network such as MPLS network 120.

The nodes 121 may be any nodes which may support communications based on MPLS. For example, the nodes 121 may support forwarding of packets within the MPLS network 120 based on MPLS headers which may include labels which may be used to forward the packets across the MPLS network 120. The nodes 121 may support forwarding of packets within the MPLS network 120 based on various MPLS-related capabilities which may be supported within the MPLS network 120.

The MPLS network 120 is configured to support sequencing of MPLS packets, such that packets sent by the ingress node 121-I using a packet sequence are processed at the egress node 121-E using that packet sequence. The nodes 121 of the MPLS network 120 may be configured to support sequencing of MPLS packets. The nodes of the MPLS network 120 may be configured to support sequencing of MPLS packets based on use of sequencing elements 122 (illustratively, ingress node 121-I includes a sequencing element 122-I and egress node 121-E includes a sequencing element 122-E).

It will be appreciated that various example embodiments for supporting sequencing of labeled packets may be further understood by first considering various aspects of MPLS.

In MPLS, an MPLS header is pushed onto a packet, where a label in the MPLS header represents a forwarding equivalence class (FEC) of the packet. A FEC identifies a specific class of packets that receive the same forwarding treatment within the MPLS domain. The encoding of an MPLS header is typically based on a Label Stack Entry that includes a Label Value field (typically denoted as Label, 20 bits), an Experimental Bits field (typically denoted as Exp, 3 bits), a Bottom of Stack bit field (typically denoted as S, 1 bit), and a Time to Live field (typically denoted as TTL, 8 bits). Here, within the context of MPLS, the term "label" refers to the MPLS header unless indicated otherwise.

In MPLS, MPLS packets are sent over Label Switched Paths (LSPs). In MPLS, there are two modes of forwarding: unicast and multicast. In unicast, MPLS packets are sent from an ingress node to an egress node along a unicast LSP, where an LSP is identified by its FEC. The use of unicast forwarding in MPLS may be further understood by way of reference to FIG. 2. In multicast, MPLS packets are sent from an ingress node to multiple egress nodes along a multicast LSP, such as a Point-to-Multipoint (P2MP) LSP or a Multipoint-to-Multipoint (MP2MP) LSP. The use of multicast forwarding in MPLS may be further understood by way of reference to FIG. 3.

Figure 2:
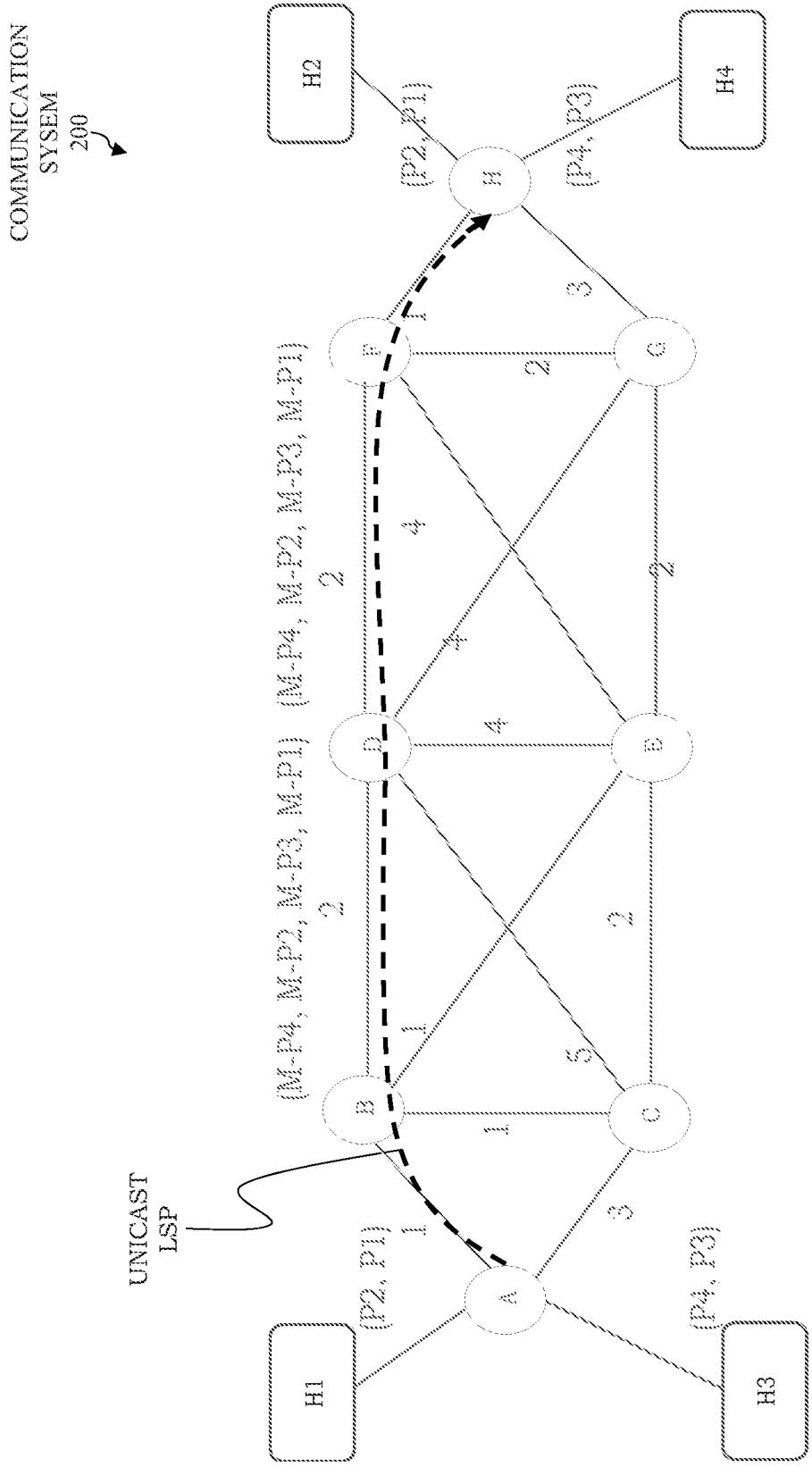
FIG. 2 depicts an example embodiment of a communication system including an MPLS network for illustrating tunneling of IP packets between a pair of hosts over a unicast LSP.

FIG. 2 depicts an example embodiment of a communication system including an MPLS network for illustrating tunneling of IP packets between a pair of hosts over a unicast LSP. In FIG. 2, a communication system 200 includes a set of hosts (denoted as hosts H1-H4) and a set of MPLS nodes (denoted as nodes A-H), where the MPLS nodes are configured to provide an MPLS network.

In FIG. 2, Host H1 sends TCP/IP packets to host H2 for a TCP connection. In the TCP connection, TCP port numbers in H1 and H2 are denoted as H1-tcp-port and H2-tcp-port, respectively.

In FIG. 2, Host H3 sends TCP/IP packets to host H4 for a TCP connection. In the TCP connection, TCP port numbers in H3 and H4 are denoted as H3-tcp-port and H4-tcp-port, respectively.

In FIG. 2, assume that the IP addresses assigned to identify the hosts and the nodes are the names assigned to the hosts and the nodes, respectively. For example, H1 is the IP address of host H1, H2 is the IP address of host H2, and so forth. Similarly, for example, A is the IP address of MPLS node A, B is the IP address of node B, and so forth.

In FIG. 2, for the TCP/IP packets sent from H1 to H2 and from H3 to H4, node A is the ingress node in the MPLS network and node H is the egress node in the MPLS network. A unicast LSP is established from node A to node H on which the TCP/IP packets are sent.

In FIG. 2, a cost is assigned to each link in the MPLS network. Typically, asymmetric costs are assigned on each direction of a link; however, for simplicity and without the loss of generality, the network in FIG. 2 uses the same cost on each direction. Each node is running a link state routing protocol such as Open Shortest Path First (OSPF), Intermediate System to Intermediate System (IS-IS), OSPF version 3 (OSPFv3), or the like. The cost and state of each link is flooded across the nodes in the MPLS network by the routing protocol, based on which each node builds an identical topology database of the MPLS network. Then, each node computes the shortest path to every other node by running the shortest path first (SPF) algorithm (also known as Dijkstra's algorithm) on the topology database. For example, the shortest path computed by node A to node H is A->B->D->F->H, which is of cost 6.

In FIG. 2, a unicast LSP is set-up to each node in the MPLS network along the shortest path to the node as computed by the routing protocol. The LSP can be setup by MPLS signaling protocols such as the Label Distribution Protocol (LDP) or the like. Here, consider the setup of the shortest path LSP from node A to node H. The LSP is identified by the IP address of node H, i.e., the FEC of the LSP is H. Node H allocates a label (from its label space) for LSP H and floods the label mapping to the neighboring nodes F and H. Each neighboring node in turn allocates a label for LSP H and floods the label mapping to their neighboring nodes. Herein, denote the label allocated by a node X for LSP H as L_H_X. For example, label allocated by node D for LSP H is L_H_D and label allocated by H for LSP H is L_H_H. Each node chooses the next-hop in the shortest path to H as the next-hop of LSP H and uses the label advertised by the next-hop to send packets on the LSP. So, the path of the LSP H from A to H is A->B->D->F->H.

In FIG. 2, consider the forwarding of a TCP/IP packet P1 sent by H1 to H2. H1 sends the packet P1 to ingress node A. Since the destination IP address of P1 is H, node A tunnels P1 to H over LSP H. Node A pushes label L_H_B onto P1 and sends MPLS packet {L_H_B, P1} to next-hop node B. In FIG. 2, the MPLS packet is prefixed with "M-". For example, M-P1 is the packet P1 encapsulated by label of the LSP, i.e., the MPLS packet {L_H_B, P1}. On receiving the MPLS packet, node B swaps the received L_H_B with label L_H_D and sends the MPLS packet {L_H_D, P1} to node D. Every node along the path switches the received label with the label advertised by the next-hop and eventually the packet {L_H_H, P1} reaches node H. Node H pops the label L_H_H, since it is the egress node of the LSP, and forwards the IP packet P1 to H2 based on IP forwarding states.

In FIG. 2, (P1, P2) is a sequence of packets sent by H1 to H2 and (P3, P4) is a sequence of packets sent by H3 to H4. The packets in a sequence are shown in the reverse order because the rightmost packet is the first packet in the sequence. Here, assume that the packets arrive at node A in the order (P1, P3, P2, P4). Then packets are sent by node A on the LSP in the same order. The transit nodes of the LSP do not change the order and, thus, the packets arrive at egress node H in the same order.

In FIG. 2, the LSP is an example of stateful forwarding in MPLS, because every transit node of the LSP maintains state of the LSP. An alternate paradigm is stateless LSP, in which only the ingress node maintains the state of the LSP. So, there is no signaling required to set up the states of the LSP along its path. In the stateless paradigm, every node allocates a label to identify the node itself and a label for each adjacent link. Here, assume that label L X->Y denotes the label allocated by the node X to identify its adjacent link X->Y. For example, the label allocated by node A to identify link A->B is L_A->B, the label allocated by node D to identify link D->F is L_D->F, and so forth. The label mappings of the nodes and links are flooded throughout the network. Then, to send a packet along a specific path in the MPLS network, the ingress node pushes an ordered set of labels (label stack) onto the packet, where each label represents a link in the path. Each transit node pops the topmost label in the stack and forwards the packet on the link represented by the label. This pop-n-forward action continues along the path until the label stack becomes empty, i.e., the packet reaches the egress node. To send a packet along the path A->B->D->F->H, node A pushes the label stack {L_B->D, L_D->F, L_F->H} onto the packet and forwards the packet on the A->B link. When node B receives the MPLS packet, it pops the label L_B->D as it identifies B->D link and forwards the MPLS packet {L_D->F, L_F->H, P1} on B->D link. When node D receives the MPLS packet, it pops the label L_D->F as it identifies D->F link and forwards the MPLS packet {L_F->H, P1} on D->F link. When node F receives the MPLS packet, it pops the label L_F->H as it identifies F->H link and forwards the packet P1 on F->H link. The node H receives the packet P1 and forwards to host H2 based on its IP forwarding states. It will be appreciated that the stateless model is also known as "source routing" or "segment routing" in MPLS.

Figure 3:
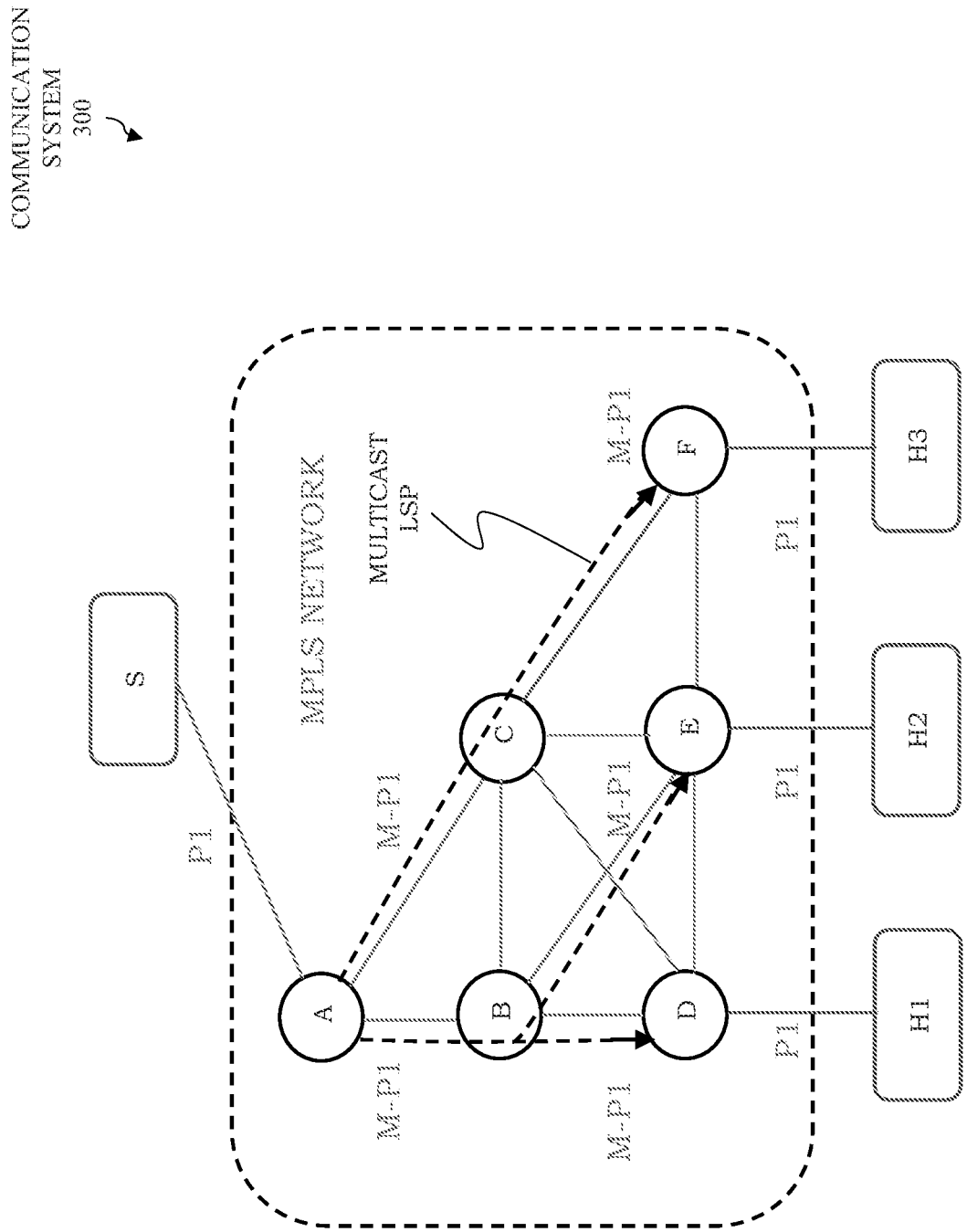
FIG. 3 depicts an example embodiment of a communication system including an MPLS network for illustrating multicast in an MPLS domain using a multicast LSP.

FIG. 3 depicts an example embodiment of a communication system including an MPLS network for illustrating multicast in an MPLS domain using a multicast LSP.

In FIG. 3, a communication system 300 includes a multicast source (denoted as S), a set of hosts (denoted as H1-H3), and a set of nodes (denoted as nodes A-F) where the nodes are configured to provide an MPLS network for supporting transport of packets from the multicast source to the hosts.

In FIG. 3, S is a system (e.g., server or the like) that multicasts packets of a flow to the three hosts H1, H2 and H3, respectively, via the MPLS network that includes nodes A-F. The multicast source S and the hosts H1, H2, are H3 are systems in a non-MPLS domain (e.g., an IP domain) which are connected to edge nodes in the MPLS network (illustratively, to nodes A, D, E, and F, respectively). A multicast LSP is formed where the node A is the root of the LSP and the nodes D, E, and F are the leaf nodes of the LSP. As discussed further below, a multicast LSP may be stateful or stateless.

In FIG. 3, assume that the multicast LSP is identified by the FEC={Root=A, LSP_ID=M1}, where LSP_ID is a unique identifier of the LSP with respect to the root. In the stateful paradigm of signaling a multicast LSP, a leaf node first receives a registration request from a locally connected host (H1, H2 or H3) and, based on a local policy at the leaf node, the registration request is associated with the multicast LSP/FEC. The leaf nodes then initiates a "join" request to the root node of the multicast LSP along the shortest path to the root node. The shortest path may be computed in the same way as described for unicast in FIG. 2. A join request is advertisement of a label for a multicast LSP. Here, denote the label advertised by node X for the multicast LSP={Root=A, LSP_ID=M1} as L_A_M1_X. The next-hop from node D on the shortest path to root node A is B. So, node D initiates a join request to node B with label L_A_M1_D. The next-hop from node E on the shortest path to root node A is B. So, node E initiates a join request to node B with label L_A_M1_E. The join requests from node D and node E merge at node B. Upon receiving the first join request from either node D or node E, node B sends a join request to node A with label L_A_M1_B. Similarly, node F initiates a join request to node C (the next-hop of node F on the shortest path to node A) with label L_A_M1_F. On receiving the join request, node C sends a join request to node A with label L_A_M1_C.

In FIG. 3, assume that multicast source S multicasts a packet P1 to hosts H1, H2 and H3. P1 is first received by node A, which multicasts the packet on the multicast LSP. Node A makes two copies of the packet. In the first copy, it pushes the label L_A_M1_B and the MPLS packet {L_A_M1_B, P1} is forwarded on the A->B link. In the second copy, it pushes the label L_A_M1_C and the MPLS packet {L_A_M1_C, P1} is forwarded on the A->C link. In FIG. 3, the MPLS packet is prefixed with "M-". For example, M-P1 is the packet P1 encapsulated by label of the multicast LSP. Node B, upon receiving the multicast packet {L_A_M1_B, P1}, makes two copies of the packet. In the first copy, node B swaps the label L_A_M1_B with L_A_M1_D and the MPLS packet {L_A_M1_D, P1} is forwarded on the B->D link. In the second copy, node B swaps the label L_A_M1_B with L_A_M1_E and the MPLS packet {L_A_M1_E, P1} is forwarded on B->E link. Node D, upon receiving the MPLS packet L_A_M1_D, P1}, pops the label as this is the egress node for the LSP. Then, node D forwards packet P1 on the D->H1 link based on the local policy and the native header of P1, which is received by host H1. In a similar way, copies of P1 also are received by host H2 and host H3.

In FIG. 3, the multicast LSP is an example of stateful forwarding in MPLS, because every transit node of the multicast LSP maintains state of the LSP. An alternate paradigm is stateless multicast LSP, in which only the root node maintains the state of the LSP. So, there is no signaling required to set up the multicast LSP. In this paradigm, every node allocates a label to identify the node itself and a label to identify each adjacent link. Here, assume that label L X->Y denotes the label allocated by the node X to identify its adjacent link X->Y. For example, the label allocated by node A to identify link A->B is L_A->B, the label allocated by node D to identify link D->F is L_D->F, and so forth. The label mappings of the nodes and links are flooded throughout the network. Then, to multicast a packet along a specific tree in the MPLS network, the root node pushes a set of labels (label stack) onto the packet, where each label represents a link in the LSP tree. Each transit node parses the label stack to find the labels that indicate its adjacent links. Then, the node removes the matching labels from the label stack and replicates a copy of the packet on each adjacent link. This mode of forwarding action continues until a node finds no more adjacent links in the label stack. In that case, the node is a leaf node, so it pops all remaining labels (if any) and forwards the packet to the relevant host.

Now, consider a stateless version of the example described above within the context of FIG. 3. Upon receiving registration request from a locally connected host (H1, H2 or H3), a leaf node advertises its interest to node A via an out-of-band mechanism for the context associated with the registration request. On receiving the interests from node D, node E and node F, node A determines those as the leaf nodes for a common multicast context. Then, node A computes the multicast tree (i.e., the set of links) for the context to reach host H1, host H2, and host H3. Here, assume that the links of the multicast tree are the same as shown in FIG. 3. For stateless multicast of packet P1, node A inserts the label stack {L_B->D, L_B->E, L_C->F} on P1 and replicates the MPLS packet on links A->B and A->C. Node B, upon receiving the MPLS packet {L_B->D, L_B->E, L_C->F, P1}, identifies locally adjacent links B->D and B->E from the labels L_B->D and L_B->E, respectively. Node B removes those two labels from the label stack and replicates the MPLS packet {L_C->F, P1} on links B->D and B->E, respectively. Node C, upon receiving the MPLS packet {L_B->D, L_B->E, L_C->F, P1}, identifies locally adjacent link C->F from the label L_C->F. Node C removes that label from the label stack and replicates the MPLS packet {L_B->D, L_B->E, P1} on link C->F. Node D and node E, upon receiving the MPLS packet {L_C->F, P1}, does not find any label matching their adjacent links and thus, removes the label stack from the MPLS packet and forwards P1 to H1 or H2 based on the local policy and the native header of P1. Node F, upon receiving the MPLS packet {L_B->D, L_B->E, P1, P1}, does not find any label matching its adjacent links and, thus, removes the label stack from the MPLS packet and forwards P1 to H3 based on the native header of P1. It is noted that, in the stateless multicast paradigm, the leaf node is not aware of the context of the multicast LSP on which the root node has multicast the packet.

Figure 4A:
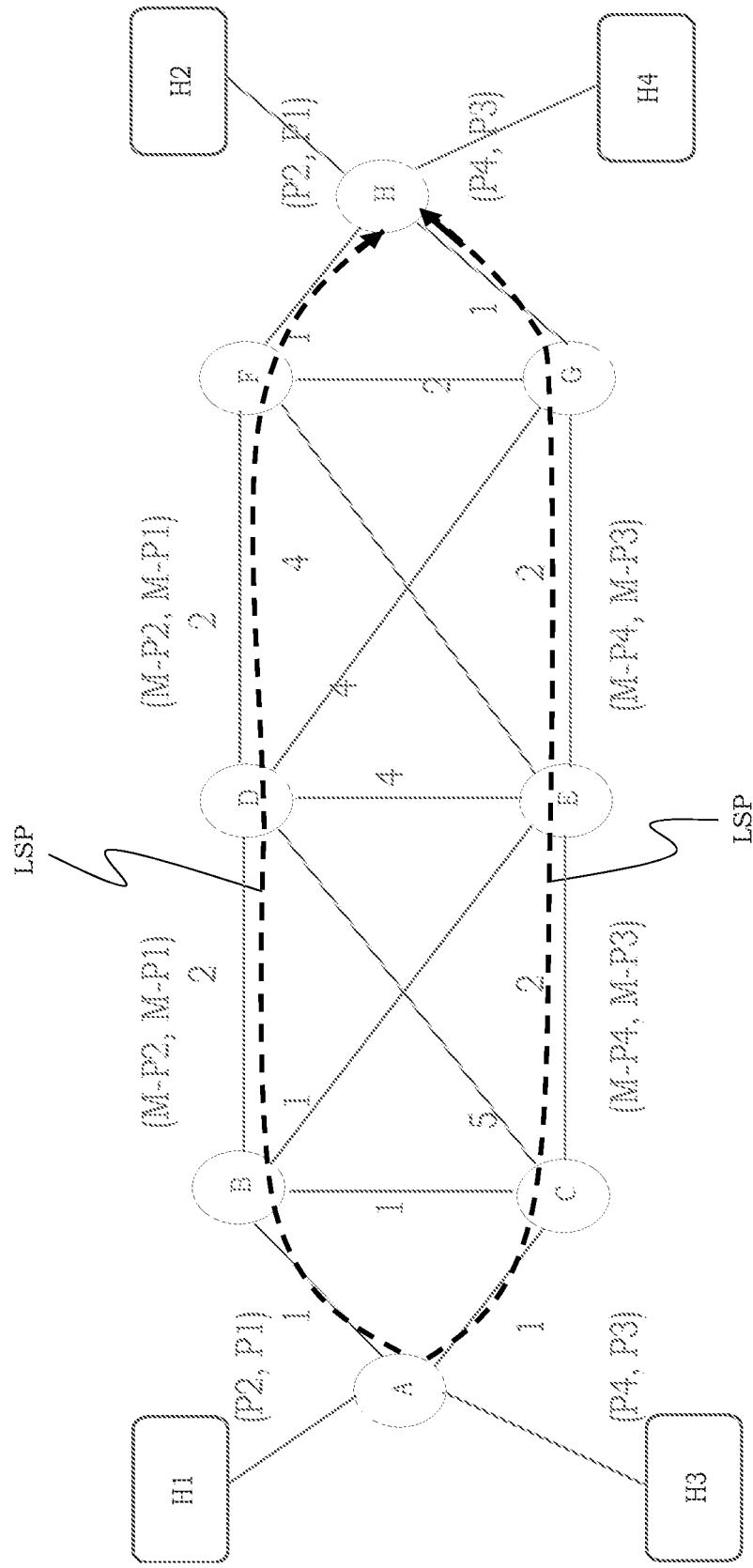
FIGS. 4A and 4B depicts an example embodiment of a communication system including an MPLS network for illustrating load balancing of a unicast LSP over equal cost multi-path (ECMP) paths.
Figure 4B:
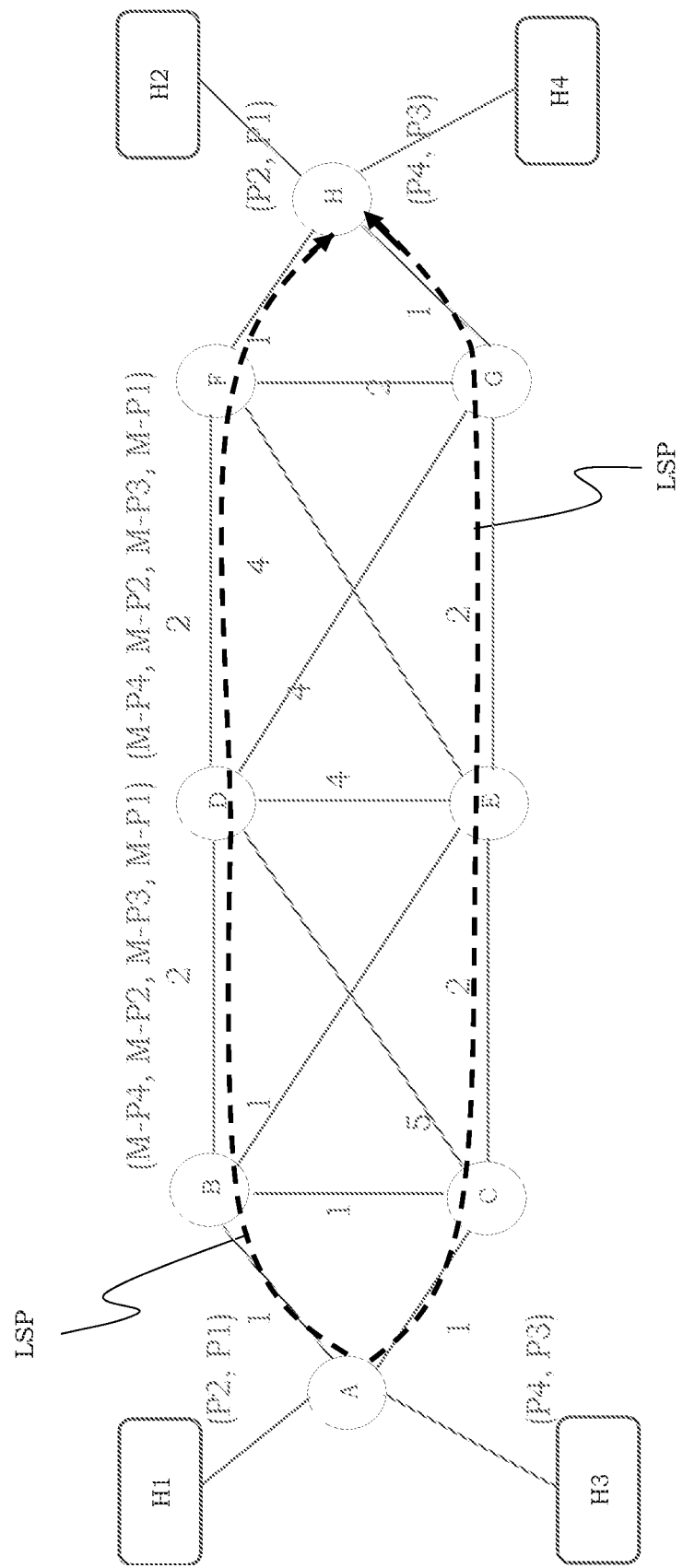

FIGS. 4A and 4B depict an example embodiment of a communication system including an MPLS network for illustrating load balancing of a unicast LSP over equal cost multi-path (ECMP) paths.

In FIGS. 4A and 4B, the example of FIG. 2 is extended by changing the cost of link A->C and link G->H. In FIGS. 4A and 4B, node A has two equal cost shortest paths to node H: one along A->B->D->F->H (denoted as Path 1) and another along A->C->E->G->H (denoted as Path 2), both bearing the cost 6. So, the LSP is set-up on both the paths. The MPLS packets sent on the LSP are load balanced over the paths. However, in existing MPLS technology, MPLS packets for a packet flow generally cannot be reordered by the load balancing scheme when the packets travel from an ingress node to an egress node in the MPLS network, because the packets of the flow must arrive in the order at its final destination. Herein, a "packet flow" means a classification of packets to a common destination that needs be received strictly in order. For example, in the case of IP packets sent over a unicast LSP (e.g., as in FIGS. 4A and 4B), the packet flow could be identified by the tuple {source IP address, destination IP address, transport protocol type, source port of transport protocol, destination port of transport protocol}, where the transport protocol could be Transmission Control Protocol (TCP), User Datagram Protocol (UDP), Stream Control Transmission Protocol (SCTP), or the like. For the example, in FIGS. 4A and 4B, there are two packet flows as follows: (1) Flow 1 from H1 to H2 with identifier {H1, H2, TCP, H1-tcp-port, H2-tcp-port} and (2) Flow 2 from H3 to H4 with identifier {H3, H4, TCP, H3-tcp-port, H4-tcp-port}.

As illustrated in FIG. 4A, in order to load balance MPLS packets across multiple paths, a specific flow is pinned by a forwarding node to the same path. The path may be selected by computing a hash on the fields that uniquely identify the packet flow. The path pinning by node A is illustrated in FIG. 4A, where Flow 1 is pinned on Path 1 and Flow 2 is pinned on Path 2 as a result of hash computation on respective flow identifiers.

As illustrated in FIG. 4B, however, depending on the values in the fields of the two flow identifiers, both of the flows could get pinned on the same path resulting in an unfair load balancing. This is illustrated in FIG. 4B, where Flow 1 and Flow 2 both get pinned on Path 1 without using Path 2.

It will be appreciated that one way to solve the problem of unfair load balancing is to use advanced load balancing schemes such as per packet load balancing, randomized load balancing, or the like, where a flow may be sprayed across multiple paths to achieve fairness. This requires the egress node of the LSP to serialize the packets of a flow to the order as sent by the ingress node. However, this is a limitation in MPLS since the MPLS header does not encode the relevant information based on which the egress node could serialize the received out of order packets of a flow, so that packets are received by the final destination in the order. It will be appreciated that, although ECMP has been chosen herein for purposes of clarity, various other types of multipath capabilities may be used.

Figure 5:
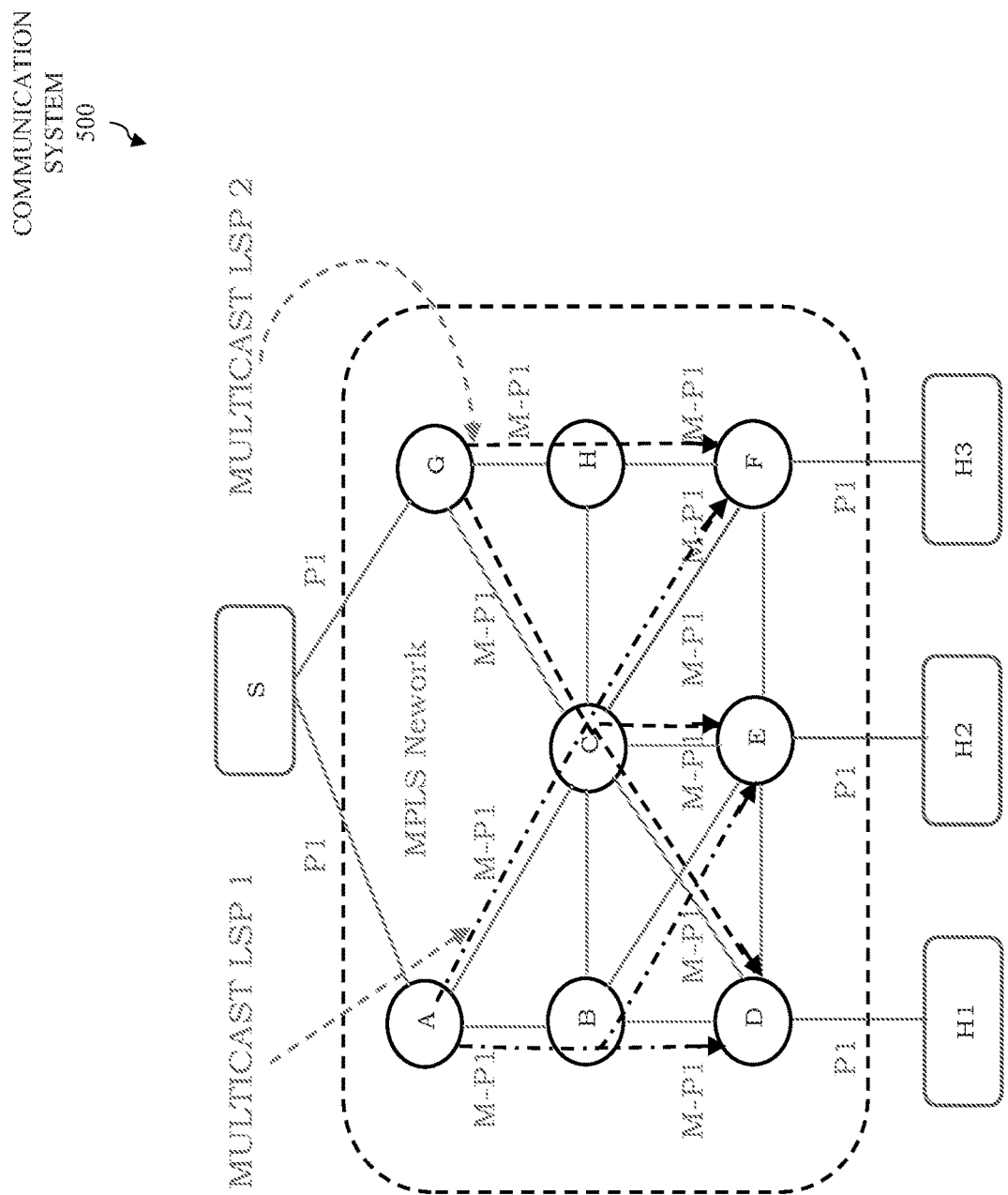
FIG. 5 depicts an example embodiment of the communication system of FIG. 3 for illustrating use of two independent multicast LSPs to protect against failure of the root node.

FIG. 5 depicts an example embodiment of the communication system of FIG. 3 for illustrating use of two independent multicast LSPs to protect against failure of the root node.

In FIG. 5, the multicast LSP 1 is rooted at node A and the multicast LSP 2 is rooted at node G. A leaf node joins both of the multicast LSPs simultaneously. Server S multicasts packets on both the LSPs simultaneously.

In stateful multicast, a leaf node is aware of the LSP on which a packet arrived because the label with which the packet arrives determines the LSP. So, a leaf node can decide to accept packets from only one LSP, i.e., the "primary" LSP.

For example, assume that the leaf nodes elect the LSP rooted at A as the primary LSP and the LSP rooted at G as the "backup" LSP. So, the leaf nodes drop packets received on the backup LSP. Leaf nodes in FIG. 5 can employ techniques to determine the liveliness of an LSP. On detection of failure to receive packets on the primary LSP, a leaf node starts accepting packets received on backup LSP.

In stateless multicast, the MPLS packet does not arrive at a leaf with the label bearing the identification of the LSP. Only root node maintains the state of the LSP. So, a leaf node typically cannot identify the LSP on which the MPLS packet arrived. When the redundancy scheme of FIG. 5 is employed, a leaf node will receive the MPLS packets from both of the LSPs, but should be able to detect and drop duplicate packets. Additionally the packets may arrive at the leaf node out of order since it is accepting packets from both of the stateless LSPs. So, a leaf node also needs to serialize the packets to the correct order before sending the packets to the host. However, this is typically a limitation in MPLS since the MPLS header does not encode the relevant information based on which the egress node could serialize the received out of order packets of a flow and detect duplicate packets of the flow, so that packets are received by the final destination in the order.

Various example embodiments may be configured to support sequencing of MPLS packets at an egress node of an MPLS network. Various example embodiments may be configured to enable an egress node in an MPLS network to properly sequence out of order MPLS packets received at the egress node to the original order in which the MPLS packets were sent by the ingress node of the MPLS network, to identify duplicate packets, or the like, as well as various combinations thereof.

Various example embodiments may be configured to support sequencing of MPLS packets at an egress node of an MPLS network based on use of an MPLS sequence header. The MPLS sequence header may be inserted at the bottom of the MPLS Label Stack, where the MPLS Label Stack represents an MPLS LSP or an MPLS multicast LSP (e.g., P2MP, MP2MP< or the like). It will be appreciated that herein, unless indicated otherwise, the bottom of the MPLS label stack means farthest from the outermost header of the packet. The MPLS sequence header may be encoded as the tuple {Source ID, Sequence ID, Sequence Number}, where the Source ID is the network wide unique identifier of the source of the MPLS packet sequence (e.g., an IP address (e.g., IPv4 or IPv6), MAC address, or the like), the Sequence ID is the identifier of the MPLS packet sequence with respect to the source node, and the Sequence Number is relative to a {Source ID, Sequence ID} tuple which uniquely identifies a MPLS packet sequence in the network. The MPLS sequence header may be encapsulated by a special label referred to as the "MPLS Sequence Indicator (MSI)" label to indicate the presence of the MPLS sequence header. It is noted that example embodiments illustrating encoding of MPLS sequencing information within label switched packets are presented with respect to FIG. 6 (encoding of an MPLS Sequence Header), FIG. 7 (encoding of an MPLS Sequence Header in an LSP hierarchy), and FIG. 8 (encoding of multiple MPLS Sequence Headers in multiple LSPs in an LSP hierarchy).

Figure 6:
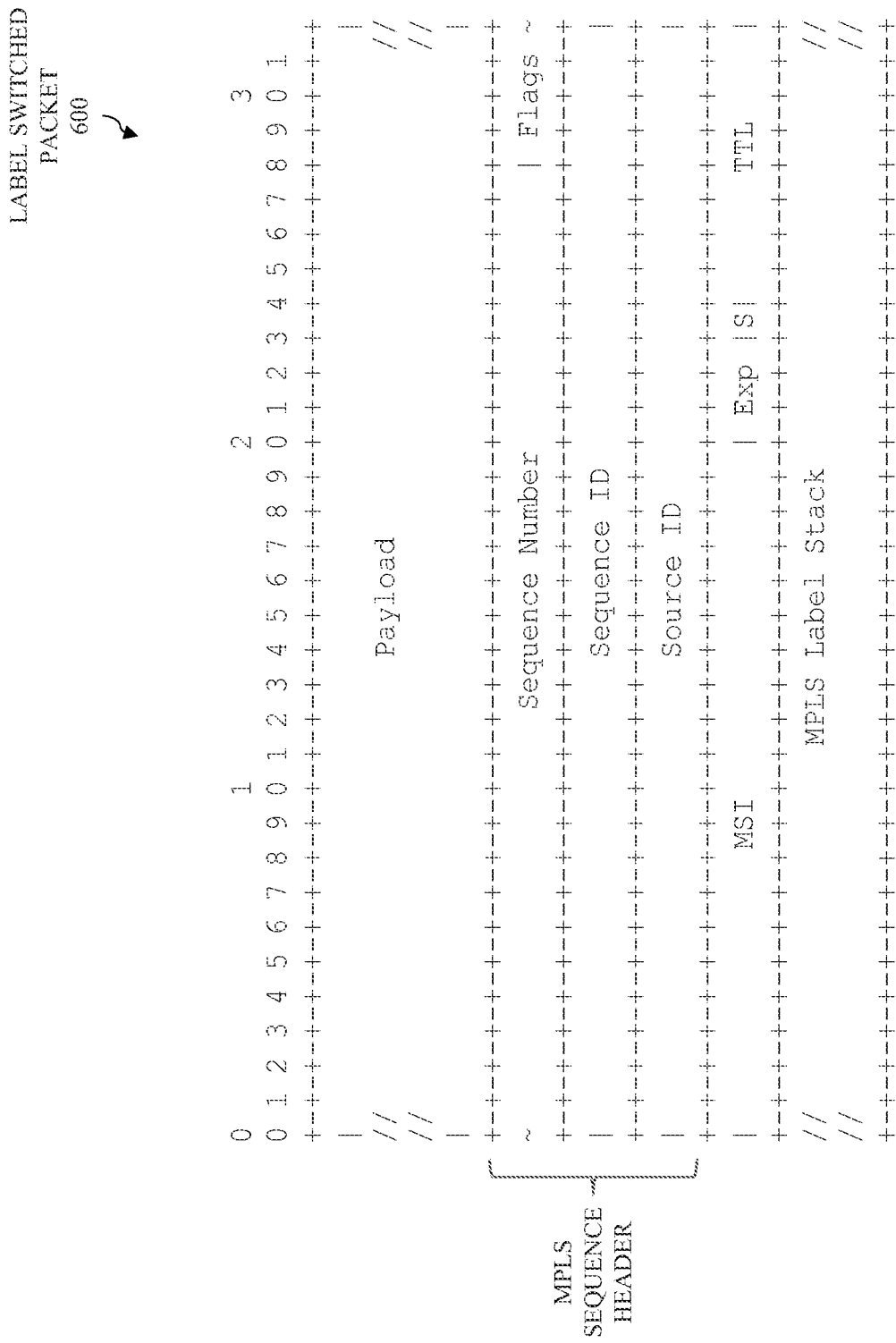
FIG. 6 depicts an example embodiment of an encoding of an MPLS Sequence Header in a label switched packet.

FIG. 6 depicts an example embodiment of an encoding of an MPLS Sequence Header in a label switched packet. In FIG. 6, the label switched packet 600 includes a payload, an MPLS Sequence Header, and an LSP Label Stack. The MPLS Sequence Header is disposed between the payload and the LSP Label Stack. The MSI label is disposed between the LSP Label Stack and the MPLS Sequence Header. An egress node, upon receiving the label switched packet 600, enqueues the packet into a queue indexed by {Source ID, Sequence ID}. The queue is sorted by the Sequence Number of the packets. When the queue has a complete sequence of packets then the entire sequence is flushed from the queue, which means that the packets are further forwarded based on the native headers of the packets. The queue also records the maximum sequence number of the last flushed sequence as the "last_flushed_sequence_number". The receiver declares a duplicate packet when it a receives a packet with a Sequence Number that matches the Sequence Number of a packet already in the queue or that is less than the last_flushed_sequence_number.

FIG. 7 depicts an example embodiment of an encoding of an MPLS Sequence Header in an LSP hierarchy in a label switched packet. In FIG. 7, the label switched packet 700 includes a payload, an MPLS Sequence Header, and an LSP Label Stack. The MPLS Sequence Header is disposed between two MPLS Label Stacks. It is noted that, in MPLS, an LSP may be overlaid on one or more LSPs in a hierarchical fashion. For example, assume that, in FIG. 4, instead of tunneling global IP packets on the unicast LSP, VPN IP packets are tunneled on the LSP. In that case, nodes A and H exchange MPLS labels that identify a VPN. When node A sends a packet to node H for a VPN, node A pushes the VPN label advertised by node H onto a packet and sends the MPLS packet to node H; however, since node H is not physically adjacent to node A, the MPLS packet needs to be tunneled over a unicast LSP to node H. Node A pushes the label of the LSP atop the VPN label and sends the MPLS packet on the LSP. Multiple VPNs can be multiplexed over a single unicast LSP, such that each VPN is equivalent to a packet flow described in FIG. 4. In that case, as illustrated in FIG. 7, the MPLS sequence header is inserted between the LSP label (generalized as MPLS Label Stack LSP 1") and the VPN label (generalized as MPLS Label Stack LSP 2) since serialization is offered by the unicast LSP. Here, the MPLS sequence header needs to indicate the presence of an additional label stack underneath and, as such a 4-bit Flags field is encoded after the Sequence Number field, wherein an S bit in the Flags indicates whether a label is present after the MPLS sequence header (e.g., if the value in S-bit is 1 then it means that no labels follow; otherwise, if the value in S-bit is 0 then it means that a label follows).

Figure 8:
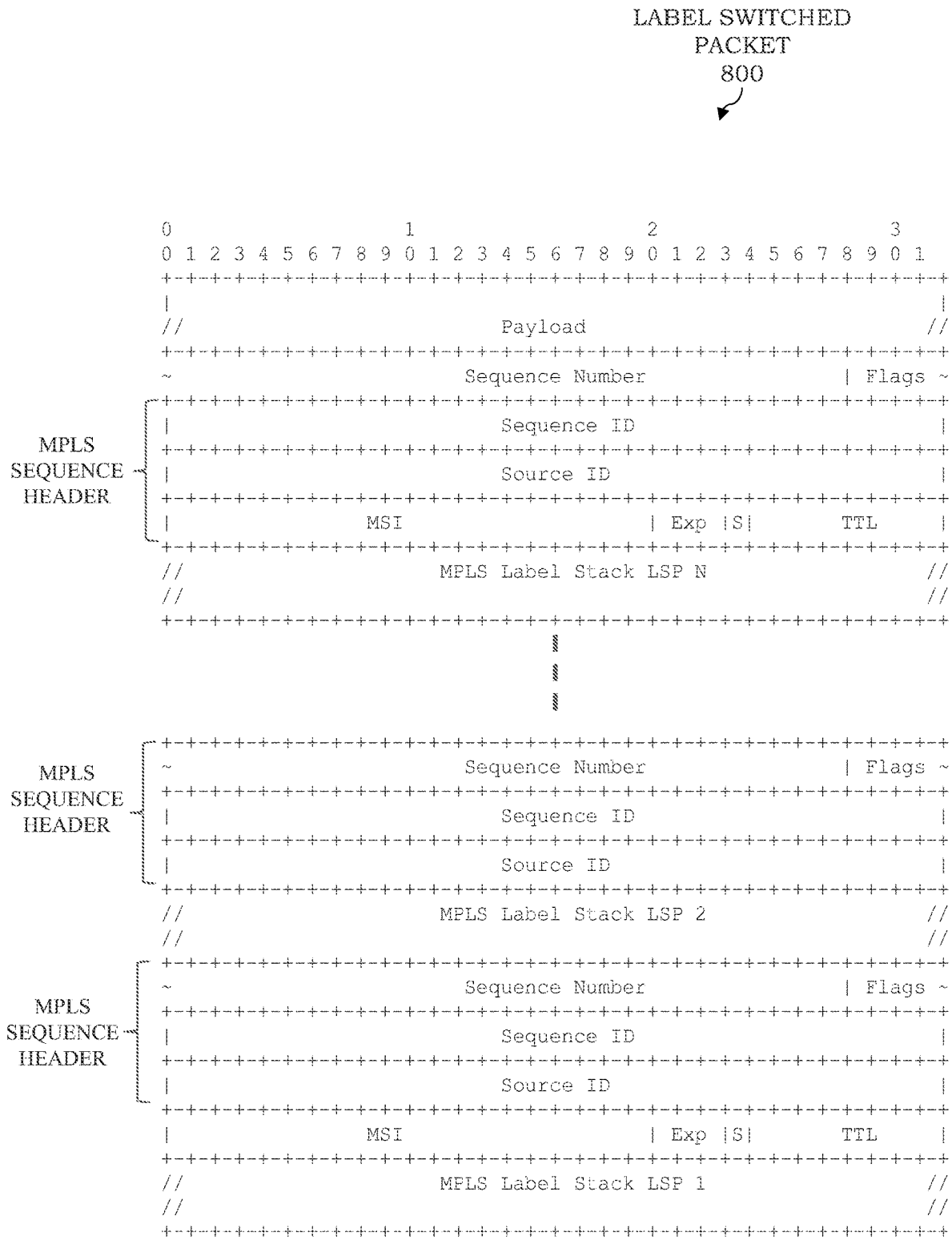
FIG. 8 depicts an example embodiment of an encoding of multiple MPLS Sequence Headers in multiple LSPs in an LSP hierarchy in a label switched packet.

FIG. 8 depicts an example embodiment of an encoding of multiple MPLS Sequence Headers in multiple LSPs in an LSP hierarchy in a label switched packet. It will be appreciated that it is possible for every LSP in a LSP hierarchy to employ sequencing of MPLS packets when each LSP can recorder packets. The generalized case is illustrated in FIG. 8 with a hierarchy of N number of LSPs.

It will be appreciated that Pseudowire (PW) is a specific application of MPLS that emulates a layer-1 or layer-2 link using an MPLS label. The placement of the PW label is equivalent to the VPN label, which is further overlaid on top of a unicast LSP. In PW, there is a way to sequence the MPLS packets based on use of a Control Word (CW) header. A CW header is pushed before pushing the MPLS label representing the PW. The CW encodes a sequence number for the packet. The format of a PW MPLS CW generally includes a first nibble (with four zeros) a 4-bit Flags field, a 2-bit Fragment field, a 6-bit Length field, and a 16-bit Sequence Number field. However, use of the CW generally has certain limitations (e.g., being limited for PW alone since the PW signaling protocol running between the endpoints of the PW negotiate the use of CW on a PW, being limited by a failure to support multi-streaming (e.g., sequencing multiple packet flows within a PW), and being limited such that LSP hierarchies generally cannot be supported). Various example embodiments presented herein for serialization of packets for various MPLS applications also may be configured to support serialization of packets on a PW.

Figure 9:
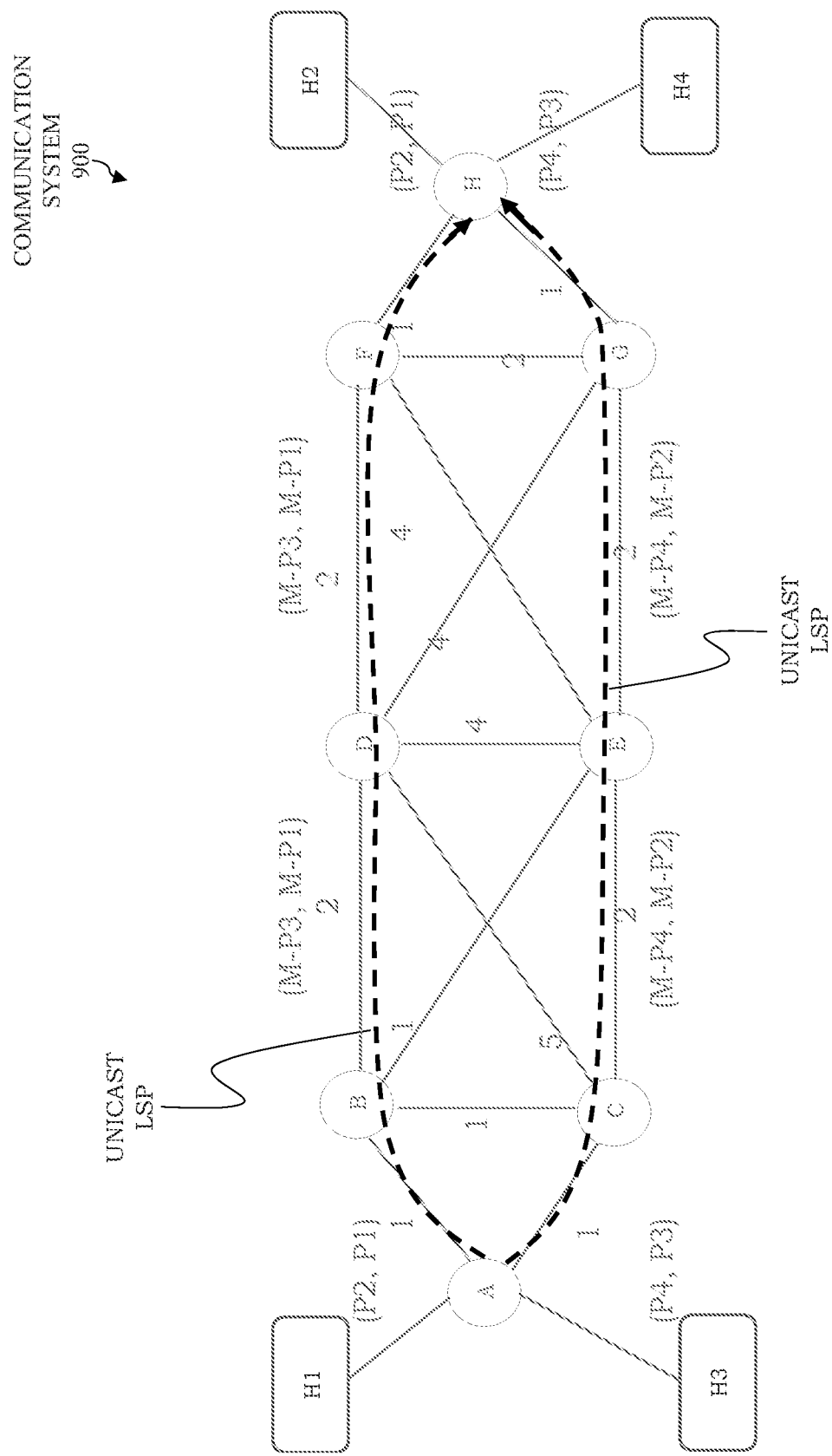
FIG. 9 depicts an example embodiment of a communication system for illustrating a solution to the unfair load balancing problem of FIG. 4B.

FIG. 9 depicts an example embodiment of a communication system for illustrating use of example embodiments of MPLS sequencing to solve the unfair load balancing problem of FIG. 4B. In FIG. 9, the communication system 900 uses the same topology and packet flows as the communication system 400 of FIG. 4B, except that per-packet load balancing is being used for fairness. In per-packet load balancing, ingress node A would spray the packets received from hosts H1 and H2 on the two paths in a round-robin fashion.

As an example, assume that the packets arrived at node A from H1 and H2 in the order P1, P2, P3, P4. So, node A load balances the packets in the following order: (1) P1 is sent on Path 1, (2) P2 is sent on Path 2, (3) P3 is sent on Path 1, and (4) P4 is sent on Path 2.

In this example, further assume that node H receives the packets in the order P2, P4, P1, P3, i.e., receives the two packets on Path 2 before receiving the two packets on Path 1. Then, node H needs to serialize the packets such that H2 is sent in the order of P1, P2 and H4 is sent in the order of P3, P4.

It will be appreciated that various example embodiments presented herein for serializing packets may be applied to serialize the packets of the example such that H2 is sent in the order of P1, P2 and H4 is sent in the order of P3, P4. In at least some embodiments, for example, sequencing of the MPLS packets may be performed at per flow granularity (i.e., 1:1 mapping between packet flow and MPLS packet sequence). In at least some example embodiments, for example, sequencing of the MPLS packet may be performed at the LSP level (i.e., agnostic of the packet flows) and, thus, using one MPLS packet sequence for the entire LSP. It will be appreciated that sequencing of the MPLS packets also may be performed in various other ways.

In at least some embodiments, as indicated above, sequencing of the MPLS packets may be performed at per flow granularity (i.e., 1:1 mapping between packet flow and MPLS packet sequence). It is noted that such example embodiments may be further understood by further considering the specific example of FIG. 9 for such embodiments.

In the example of FIG. 9, node A needs to maintain states for a packet flow as it is 1:1 mapped to a MPLS packet sequence. Source ID is the source address of a packet flow. Sequence ID is the identifier of the MPLS packet sequence assigned by node A with respect to the Source ID. So: (1) For Flow 1=>MPLS packet sequence 1={Source ID=H1, Sequence ID=1} and (2) For Flow 2=>MPLS packet sequence 2={Source ID=H3, Sequence ID=1}. Packets arrived at node A from H1 and H2 in the order P1, P2, P3, P4, which are processed as follows.

Node A receives P1 from H1 and classifies it for Flow 1, which maps to MPLS packet sequence 1. Node A sends packet P1 on Path 1 as the MPLS packet 1={L_H_B, MSI, Source ID=H1, Sequence ID=1, Sequence Number=1, P1}.

Node A receives P2 from H1 and classifies it for Flow 1, which maps to MPLS packet sequence 1. Node A sends packet P2 on Path 2 as the MPLS packet 2={L_H_C, MSI, Source ID=H1, Sequence ID=1, Sequence Number=2, P2}.

Node A receives P3 from H3 and classifies it for Flow 2, which maps to MPLS packet sequence 2. Node A sends packet P3 on Path 1 as the MPLS packet 3={L_H_B, MSI, Source ID=H3, Sequence ID=1, Sequence Number=1, P3}.

Node A receives P4 from H3 and classifies it for Flow 2, which maps to MPLS packet sequence 2. Node A sends packet P4 on Path 2 as the MPLS packet 4={L_H_C, MSI, Source ID=H3, Sequence ID=1, Sequence Number=2, P4}.

The outermost labels (i.e., LSP Label) on these packets are switched at every hop until the egress node H. Node H receives the MPLS packets in the order MPLS packet 2, MPLS packet 4, MPLS packet 1, and MPLS packet 3, and processes the MPLS packet as follows.

Node H, upon receiving the MPLS packet 2, pops the outermost label and finds MSI underneath, which indicates the presence of the MPLS sequence header. Node H finds that there is no state for {Source ID=H1, Sequence ID=1} in node H, so node H creates state for the tuple which is denoted as "MPLS packet sequence 1". The last_flushed_sequence_number in the queue is initialized as 0. Then, node H enqueues P2 onto the queue associated with MPLS packet sequence 1.

Node H, upon receiving the MPLS packet 4, pops the outermost label and finds MSI underneath, which indicates the presence of MPLS sequence header. Node H finds that there is no state for {Source ID=H3, Sequence ID=1} in node H, so node H creates state for the tuple which is denoted as "MPLS packet sequence 2". The last_flushed_sequence_number in the queue is initialized as 0. Then, node H enqueues P4 onto the queue associated with MPLS packet sequence 2.

Node H, upon receiving the MPLS packet 1, pops the outermost label and finds MSI underneath, which indicates the presence of MPLS sequence header. Node H finds that state for {Source ID=H1, Sequence ID=1} already exists, so node H enqueues P1 onto the queue associated with MPLS packet sequence 1.

Node H, upon receiving the MPLS packet 3, pops the outermost label and finds MSI underneath, which indicates the presence of MPLS sequence header. Node H finds that state for {Source ID=H3, Sequence ID=1} already exists in node H, so node H enqueues P3 onto the queue associated with MPLS packet sequence 2.

Figure 10A:
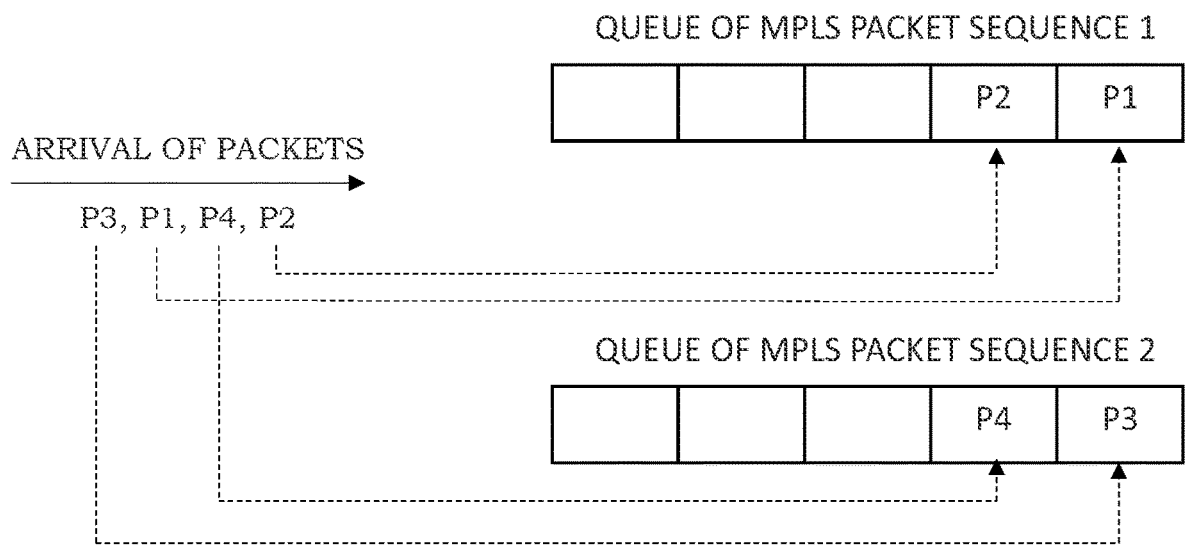
FIGS. 10A and 10B depict example embodiments of states of queues in an egress node of the communication system of FIG. 9 for sequencing of MPLS packets at per-flow granularity (FIG. 10A) and for sequencing of packets at the LSP level (FIG. 10B), respectively.

It will be appreciated that, at this point, the states of the queues in node H are as described in FIG. 10A, wherein, for each of the queues, the packets in the respective queue are ordered by the Sequence Number in their respective received MPLS sequence headers.

Since the queue in MPLS packet sequence 1 has packets P1, P2 with consecutive sequence numbers 1, 2 respectively, node H forwards the packets P1 and P2 in that order to H2. The last_flushed_sequence_number in the queue is updated to 2.

Since the queue in MPLS packet sequence 2 has packets P3, P4 with consecutive sequence numbers 1, 2 respectively, so node H forwards the packets P3 and P4 in that order to H4. The last_flushed_sequence_number parameter in the queue is updated to 2.

As indicated above, the egress node H is configured to determine whether a queue has a complete sequence of packets such that the packets may be further forwarded. For example, Node H may be configured to determine, in response to a condition, whether the MPLS sequence queue has a sequence of packets with consecutive sequence numbers, i.e., a complete sequence. The condition may be receipt of a packet (e.g., the node determines whether the MPLS sequence queue has a complete sequence each time a packet is received), a periodic condition (e.g., the node implements a timer per MPLS sequence queue and, at the expiration of a timer for a given MPLS sequence queue, the node determines whether the MPLS sequence queue has a complete sequence), or the like, as well as various combinations thereof. If the MPLS sequence queue has a complete sequence, then node H forwards the packets in the sequence to their destination in the order of their sequence numbers. If the MPLS sequence queue does not yet have a complete sequence, then node H continues checking for a complete sequence in accordance with the defined condition(s).

In this manner, the MPLS packets, although received out of order at egress node H, are correctly sequenced at node H based on sequencing of the MPLS packets at per-flow granularity.

In at least some example embodiments, as indicated above, sequencing of the MPLS packet may be performed at the LSP level (i.e., agnostic of the packet flows) and, thus, using one MPLS packet sequence for the entire LSP. It is noted that such example embodiments may be further understood by further considering the specific example of FIG. 9 for such embodiments.

In the example of FIG. 9, node A is agnostic of the packet flows as the MPLS packet sequence is created for the entire LSP. Source ID is the address of node A. Sequence ID is derived from the identifier of the LSP, let's say here LSP identifier is 1. So, Flow 1, Flow 2=>MPLS packet sequence 1={Source ID=A, Sequence ID=1}. Packets arrived at node A from H1 and H2 in the order P1, P2, P3, P4, which are processed as follows.

Node A receives P1 from H1 which maps to MPLS packet sequence 1. Node A sends packet P1 on Path 1 as the MPLS packet 1={L_H_B, MSI, Source ID=A, Sequence ID=1, Sequence Number=1, P1}.

Node A receives P2 from H1 which maps to MPLS packet sequence 1. Node A sends packet P2 on Path 2 as the MPLS packet 2={L_H_C, MSI, Source ID=A, Sequence ID=1, Sequence Number=2, P2}.

Node A receives P3 from H3 which maps to MPLS packet sequence 1. Node A sends packet P3 on Path 1 as the MPLS packet 3={L_H_B, MSI, Source ID=A, Sequence ID=1, Sequence Number=3, P3}.

Node A receives P4 from H3 which maps to MPLS packet sequence 1. Node A sends packet P4 on Path 2 as the MPLS packet 4={L_H_C, MSI, Source ID=A, Sequence ID=1, Sequence Number=4, P4}.

The outermost labels (i.e., LSP Label) on these packets are switched at every hop until the egress node H. Node H receives the MPLS packets in the order MPLS packet 2, MPLS packet 4, MPLS packet 1, and MPLS packet 3, and processes the MPLS packets as follows.

Node H, upon receiving the MPLS packet 2, pops the outermost label and finds MSI underneath, which indicates the presence of MPLS sequence header. Node B does not find any state for {Source ID=A, Sequence ID=1} in node H, so node H creates state for the tuple which is denoted as "MPLS packet sequence 1". The last_flushed_sequence_number in the queue is initialized as 0. Then, node H enqueues P2 onto the queue associated with MPLS packet sequence 1.

Node H, upon receiving the MPLS packet 4, pops the outermost label and finds MSI underneath, which indicates the presence of MPLS sequence header. Node H finds that state for {Source ID=A, Sequence ID=1} already exists, so node H enqueues P4 onto the queue associated with MPLS packet sequence 1.

Node H, upon receiving the MPLS packet 1, pops the outermost label and finds MSI underneath, which indicates the presence of MPLS sequence header. Node H finds that state for {Source ID=A, Sequence ID=1} already exists, so node H enqueues P1 onto the queue associated with MPLS packet sequence 1.

Node H, upon receiving the MPLS packet 3, pops the outermost label and finds MSI underneath, which indicates the presence of MPLS sequence header. Node H finds that state for {Source ID=A, Sequence ID=1} already exists, so node H enqueues P3 onto the queue associated with MPLS packet sequence 1.

Figure 10B:
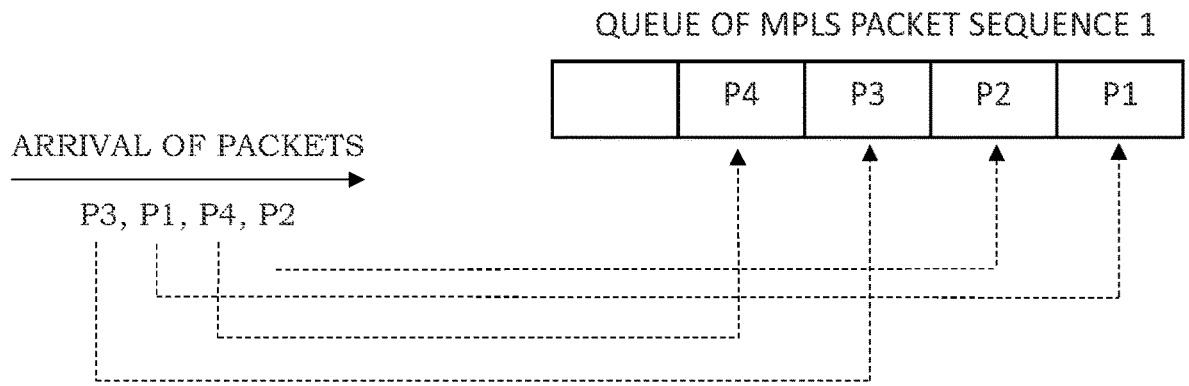

It will be appreciated that, at this point, the states of the queues in node H are as described in FIG. 10B, wherein, for each of the queues, the packets in the respective queue are ordered by the Sequence Number in their respective received MPLS sequence headers.

Since the queue in MPLS packet sequence 1 has packets P1, P2, P3, P4 with consecutive sequence numbers 1, 2, 3, 4 respectively, node H forwards the packets in that order. P1 and P2 are forwarded to H2. P3 and P4 are forwarded to H4. The last_flushed_sequence_number in the queue is updated to 2.

As indicated above, the egress node H is configured to determine whether a queue has a complete sequence of packets such that the packets may be further forwarded. For example, Node H may be configured to determine, in response to a condition, whether the MPLS sequence queue has a sequence of packets with consecutive sequence numbers, i.e., a complete sequence. The condition may be receipt of a packet (e.g., the node determines whether the MPLS sequence queue has a complete sequence each time a packet is received), a periodic condition (e.g., the node implements a timer per MPLS sequence queue and, at the expiration of a timer for a given MPLS sequence queue, the node determines whether the MPLS sequence queue has a complete sequence), or the like, as well as various combinations thereof. If the MPLS sequence queue has a complete sequence, then node H forwards the packets in the sequence to their destination in the order of their sequence numbers. If the MPLS sequence queue does not yet have a complete sequence, then node H continues checking for a complete sequence in accordance with the defined condition(s).

In this manner, the MPLS packets, although received out of order at egress node H, are correctly sequenced at node H based on sequencing of the MPLS packets at the LSP level.

Figure 11:
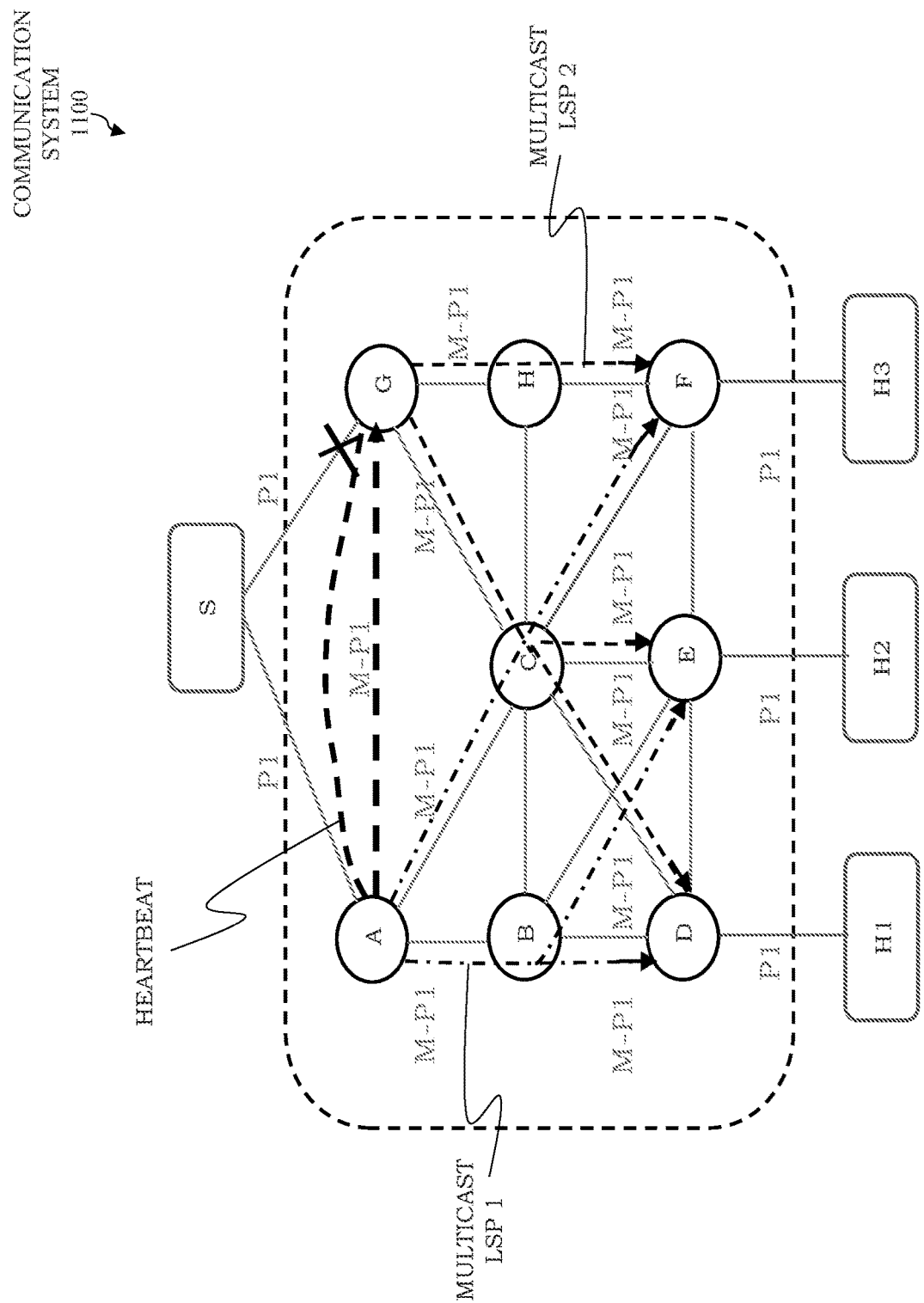
FIG. 11 depicts an example embodiment of a communication system for illustrating use of example embodiments of MPLS sequencing to serialize out of order packets and detect duplicate packets in the stateless redundant multicast LSPs of FIG. 5.

FIG. 11 depicts an example embodiment of a communication system for illustrating use of example embodiments of MPLS sequencing to serialize out of order packets and detect duplicate packets in the stateless redundant multicast LSPs of FIG. 5.

In FIG. 11, which illustrates multicasting with redundant stateless P2MP LSPs, multicast LSP 1 is the stateless P2MP LSP rooted at node A and multicast LSP 2 is the stateless multicast LSP rooted at node G.

In FIG. 11, there is a redundancy protocol (e.g., heartbeat) between the root nodes A and G. As long as the redundancy protocol indicates that node A is alive, node G drops the packets received from source S. A "backdoor channel" is created from node A to node G, through which node A sends a copy of the packets received from S to node G as MPLS packets. Node G relays the MPLS packets received on the backdoor channel on the multicast LSP 2.

In FIG. 11, node A creates an MPLS packet sequence for the multicast LSP 1. So, node A encodes an MPLS Sequence Header on every packet transmitted on multicast LSP 1. Node A also includes the Sequence Header on the copy of a packet sent on the backdoor channel to node G. Since node G relays the MPLS packets received on backdoor channel on P2MP LSP 2, every leaf node receives the duplicate copies of a packet bearing the same Sequence Number. This enables a leaf node to drop the duplicate copy. Packets accepted by a leaf node (i.e., non-duplicate packets) may arrive out of order, and such out of order packets are sequenced by the leaf node based on their respective sequence numbers before being transmitted to the local host. Node G, based on detection of the failure of the heartbeat from node A, starts accepting the packets from source S, which are multicast on LSP 2. Node G assigns Sequence Numbers subsequent to the Sequence Number of the last MPLS packet received by node G on the backdoor channel. It is noted that, during this failover, it is possible that a few packets may be lost. For example, the first packet from S that is accepted by node G after the failover (let's denote this packet as Ps) may not be the subsequent packet of the last packet received from node A before the failover (let's denote this packet as Pa). This can happen when the packets between Pa and Ps arrived at node G before failover, so node G dropped these packets, but at the time of failover these packets were enqueued either in the receiving queue of node A (from S) or in its transmission queue to node G. So, the packets between Pa and Ps will never be transmitted by node G on the multicast LSP after the failover. If the application that is generating packets from node S to the nodes H1, H2, and H3 uses a reliable delivery model (e.g., uses a reliable transport protocol such as TCP, SCTP, QUIC, or the like) then the application can recover such lost packets; however, if the application uses an unreliable delivery model, then it implies that the application is resilient to loss of packets.

Figure 12:
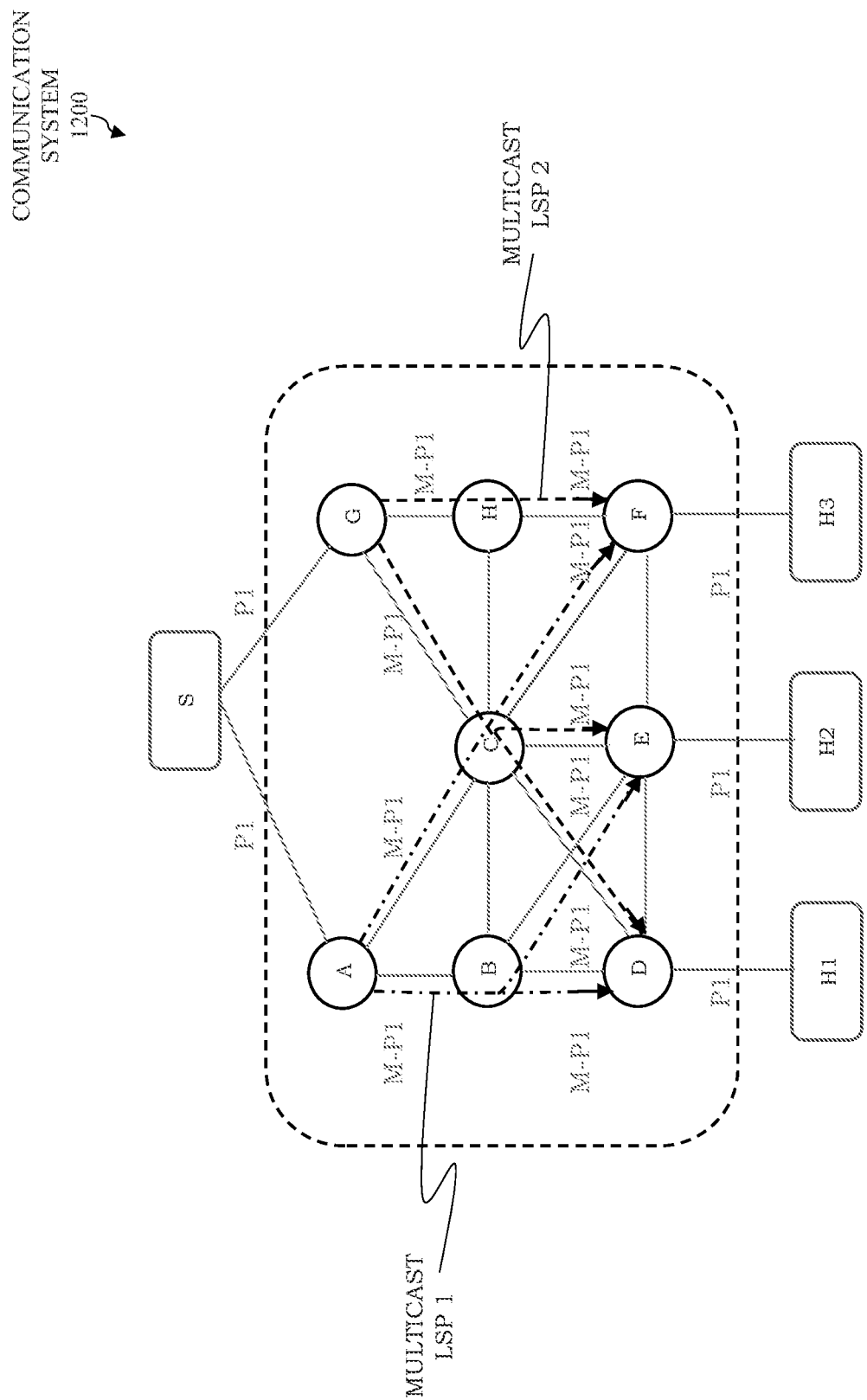
FIG. 12 depicts an example embodiment of a communication system for illustrating use of example embodiments of MPLS sequencing to serialize out of order packets and detect duplicate packets in the stateless redundant multicast LSPs of FIG. 5.

FIG. 12 depicts an example embodiment of a communication system for illustrating use of example embodiments of MPLS sequencing to serialize out of order packets and detect duplicate packets in the stateless redundant multicast LSPs of FIG. 5. Here, assuming that the native header of the packets sent by S support some kind of a Sequence Header, then both A and G simultaneously accept packets from S and multicasts on their respective stateless multicast LSPs. There is neither a need of a redundancy protocol between nodes A and G nor the need of a backdoor channel from node A to node G. In FIG. 12, while multicasting a packet on their respective multicast LSPs, nodes A and G encode an MPLS Sequence Header where the fields in the header are derived from the Sequence Header in the native headers portion of the packet. In this manner, the copies of the same packet originated from source S are multicast by nodes A and G with the same Sequence Number in the MPLS Sequence Header. So, every leaf node receives the duplicate copies of an MPLS packet bearing the same Sequence Number. This enables a leaf node to drop the duplicate packet. Packets accepted by a leaf node (i.e., non-duplicate packets) may arrive out of order, and such out of order packets are sequenced by the leaf node based on their respective sequence numbers before being transmitted to the local host. It is noted that, unlike the case in FIG. 11, there is no possibility of loss of packets during failover since node G accepts packets from source S all the time.

Figure 13:
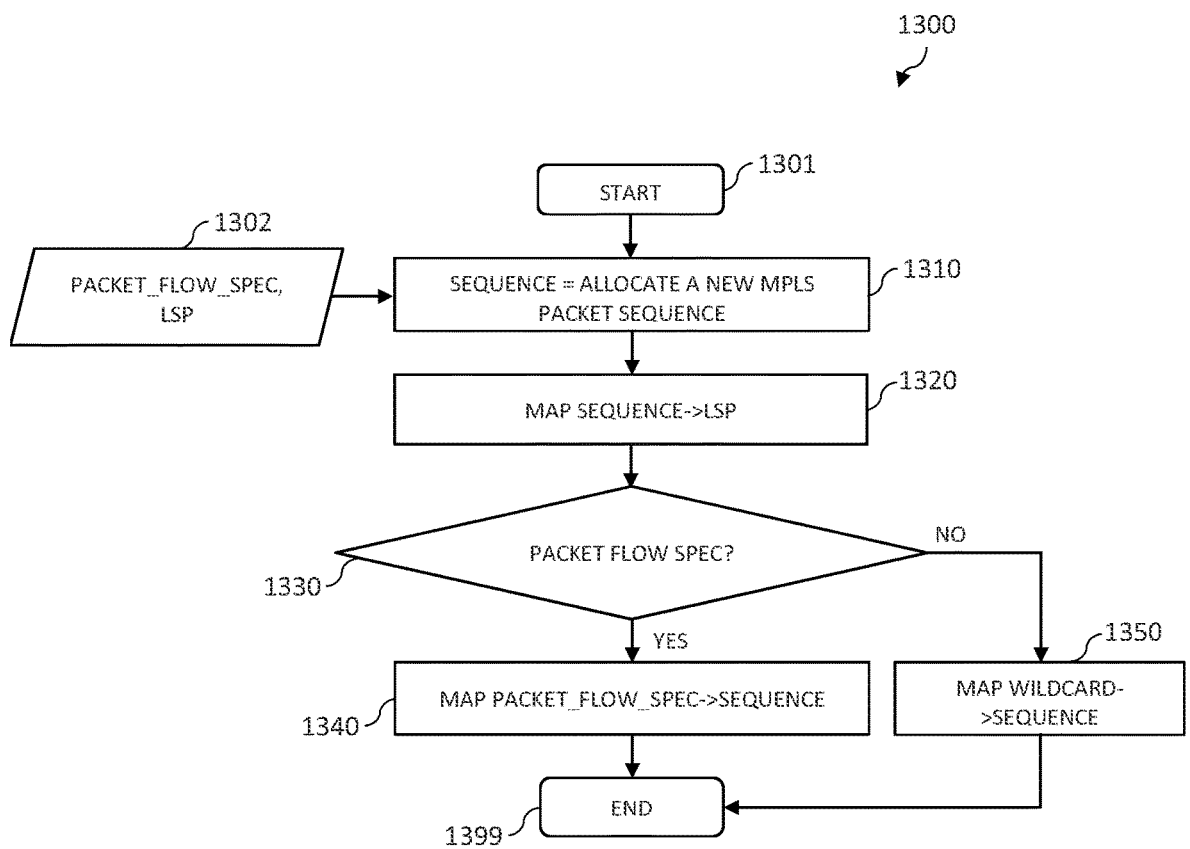
FIG. 13 depicts an example embodiment of a method for configuring an MPLS packet sequence in an ingress node of an MPLS LSP.

FIG. 13 depicts an example embodiment of a method for configuring an MPLS packet sequence in an ingress node of an MPLS LSP. At block 1301, the method 1300 begins. As indicated at block 1302, the inputs to the method 1300 include the specification of a packet flow if MPLS packets of the packet flow needs to be sequenced (Packet_Flow_Spec) and the LSP on which MPLS packet sequence is configured. Block 1310, allocates a new MPLS packet sequence with the tuple {Source ID, Sequence ID}, where the values in the tuple are chosen as deemed appropriate, and the method 1300 then proceeds to block 1320. Block 1320 maps the MPLS packet sequence to the LSP (i.e., applicable for packets to be sent on the LSP), and the method 1300 then proceeds to block 1330. Block 1330 checks if a packet flow specification was provided as input. If a packet flow specification was provided as input then the method 1300 proceeds to block 1340, otherwise the method 1300 proceeds to block 1350. Block 1340 maps the packet flow specification to the MPLS packet sequence, meaning that any packet that matches the packet flow only uses the MPLS packet sequence configuration. From block 1340, the method 1300 proceeds to block 1399, where the method 1300 end. Block 1350 maps all packets ingressing on the LSP (i.e., wildcard) to use the MPLS sequence configuration. From block 1350, the method 1300 proceeds to block 1399, where the method 1300 end.

Figure 14:
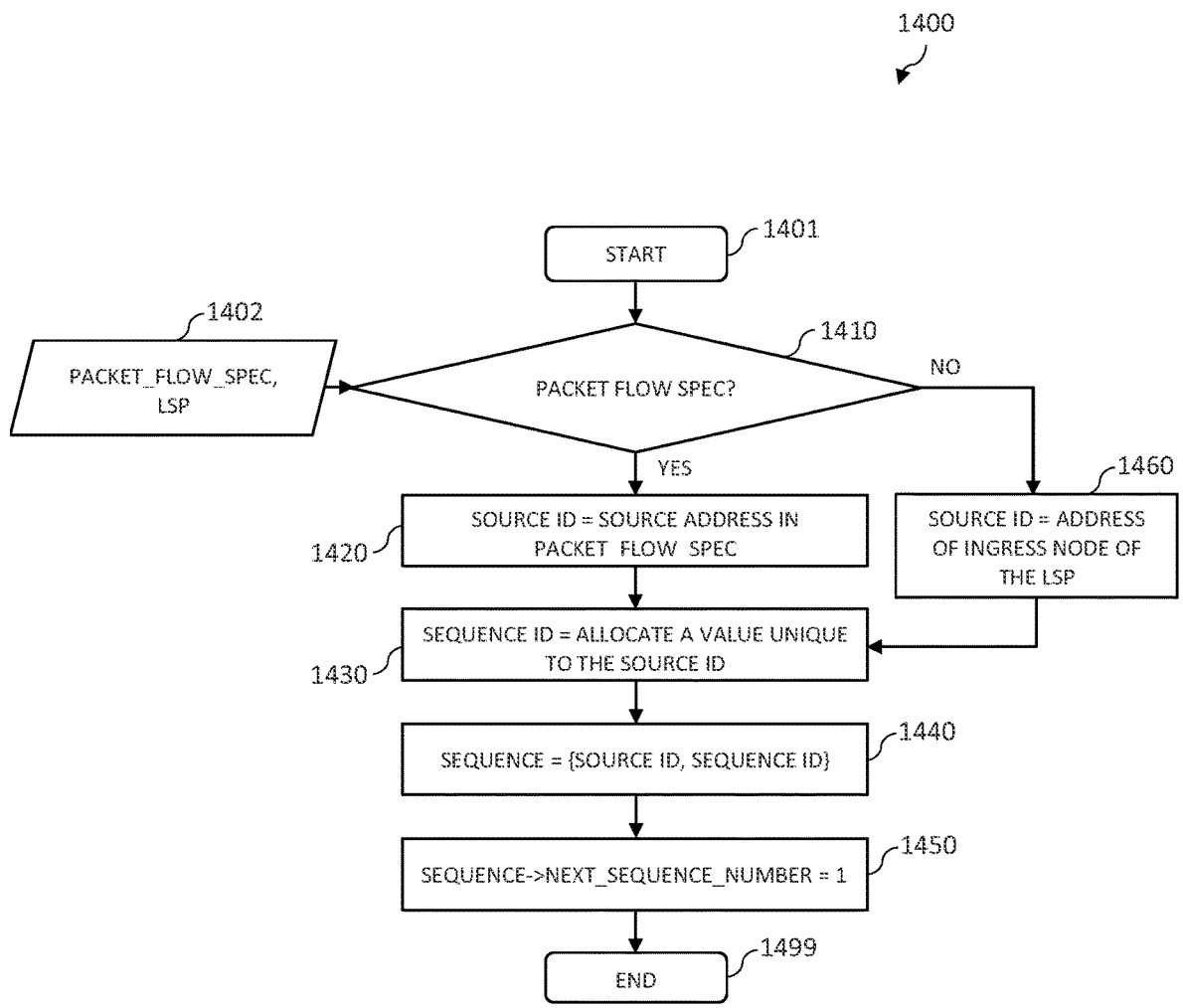
FIG. 14 depicts an example embodiment of a method for allocating a new MPLS packet sequence in an ingress node of an MPLS LSP.

FIG. 14 depicts an example embodiment of a method for allocating a new MPLS packet sequence in an ingress node of an MPLS LSP. It will be appreciated that the method 1400 of FIG. 14 may be used as block 1310 of the method 1300 of FIG. 13. At block 1401, the method 1400 begins. As indicated at block 1402, the inputs to the method 1400 include the specification of a packet flow if MPLS packets of the packet flow needs to be sequenced (Packet_Flow_Spec) and the LSP on which MPLS packet sequence is configured. Block 1410 checks if the specification of a packet flow was specified at the input. If the specification of a packet flow was specified at the input then the method 1400 proceeds to block 1420, otherwise the method 1400 proceeds to block 1460. Block 1420 decides the Source ID as the source address of the packet flow, and the method 1400 then proceeds to block 1430. Block 1460 decides the Source ID as the address of the ingress node of the LSP, and the method 1400 then proceeds to block 1430. Block 1430 allocates a Sequence ID which is unique to the Source ID. Basically, this node maintains a Sequence ID space per Source ID and allocates a new Sequence ID from that space. Block 1430 proceeds to block 1440. Block 1440 builds the identifier of the MPLS packet sequence as {Source ID, Sequence ID), and the method 1400 then proceeds to block 1450. Block 1450 sets the Sequence Number to be used for the first packet transmitted for this sequence as 1, and the method 1400 then proceeds to block 1499. At block 1499, the method 1400 ends.

Figure 15:
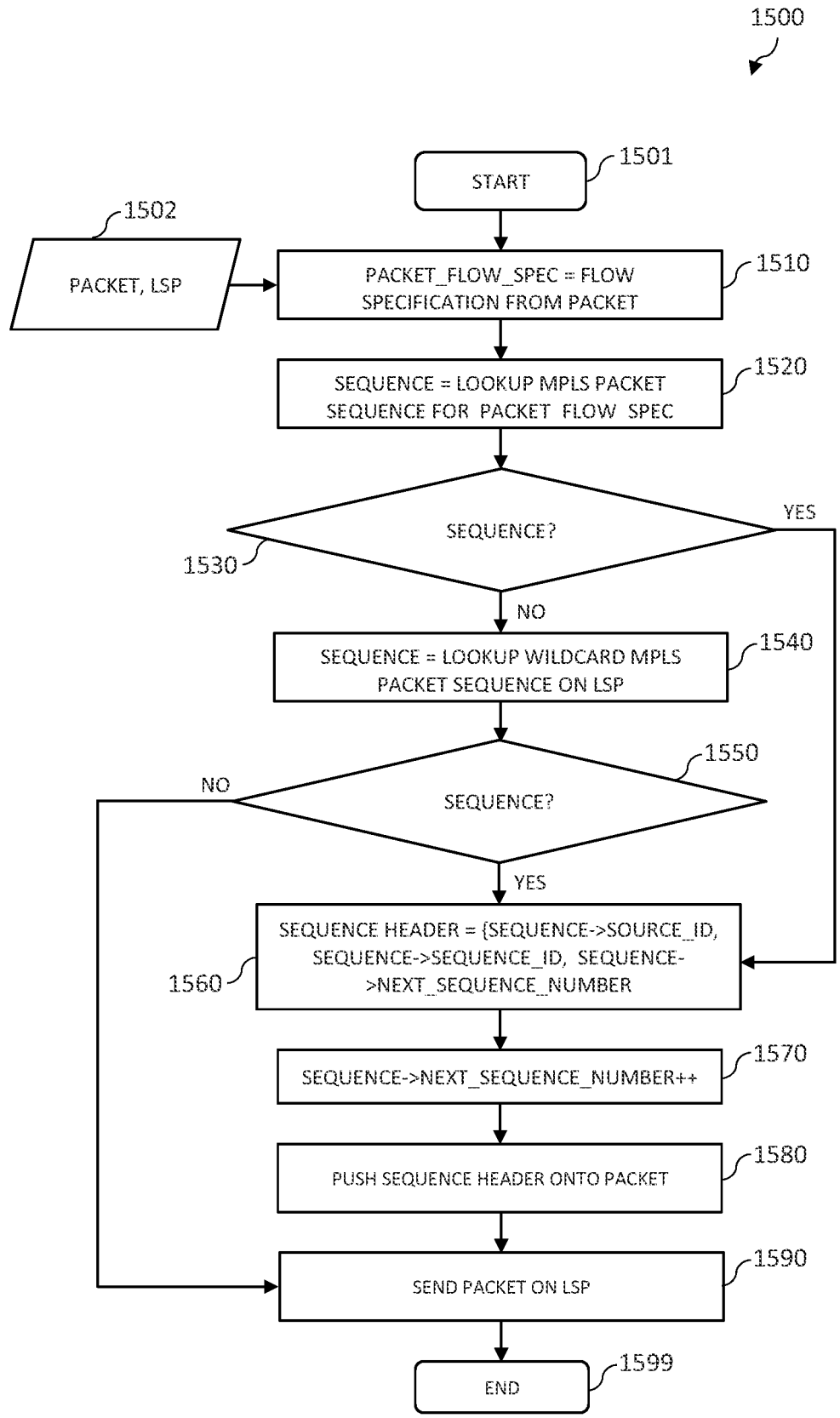
FIG. 15 depicts an example embodiment of a method for use by an ingress node to send sequenced MPLS packets on an LSP.

FIG. 15 depicts an example embodiment of a method for use by an ingress node to send sequenced MPLS packets on an LSP. At block 1501, the method 1500 begins. As indicated at block 1502, the inputs to the method 1500 include a packet to be transmitted over an LSP and an LSP. Block 1510 extracts the flow specification of the packet, and the method 1500 then proceeds to step 1520. Block 1520 looks up whether an MPLS packet sequence is configured in the LSP for the flow specification, and the method 1500 then proceeds to block 1530. Block 1530 checks if a matching MPLS packet sequence is found. If a matching MPLS packet sequence is found then the method 1500 proceeds to block 1560, otherwise the method 1500 proceeds to block 1540. Block 1540 looks up if a wildcard MPLS packet sequence is configured on the LSP, and the method 1500 then proceeds to block 1550. Block 1550 checks if a wildcard MPLS packet sequence is found. If a wildcard MPLS packet sequence is found, then the method 1500 proceeds to block 1560, otherwise the method 1500 proceeds to block 1590. Block 1560 creates a Sequence Header wherein the Source ID field is encoded with the Source ID of the MPLS packet sequence, the Sequence ID field is encoded with the Sequence ID of the MPLS packet sequence, and the Sequence Number field is encoded with the next sequence number in the MPLS packet sequence, and the method 1500 then proceeds to block 1570. Block 1570 increments the next sequence number in the MPLS packet sequence by one, and the method 1500 then proceeds to block 1580. Block 1580 pushes the Sequence Header onto the packet, and the method 1500 then proceeds to block 1590. Block 1590 sends the packet on the LSP, and the method 1500 then proceeds to block 1599, where the method 1500 ends. At block 1599, the method 1500 ends.

Figure 16:
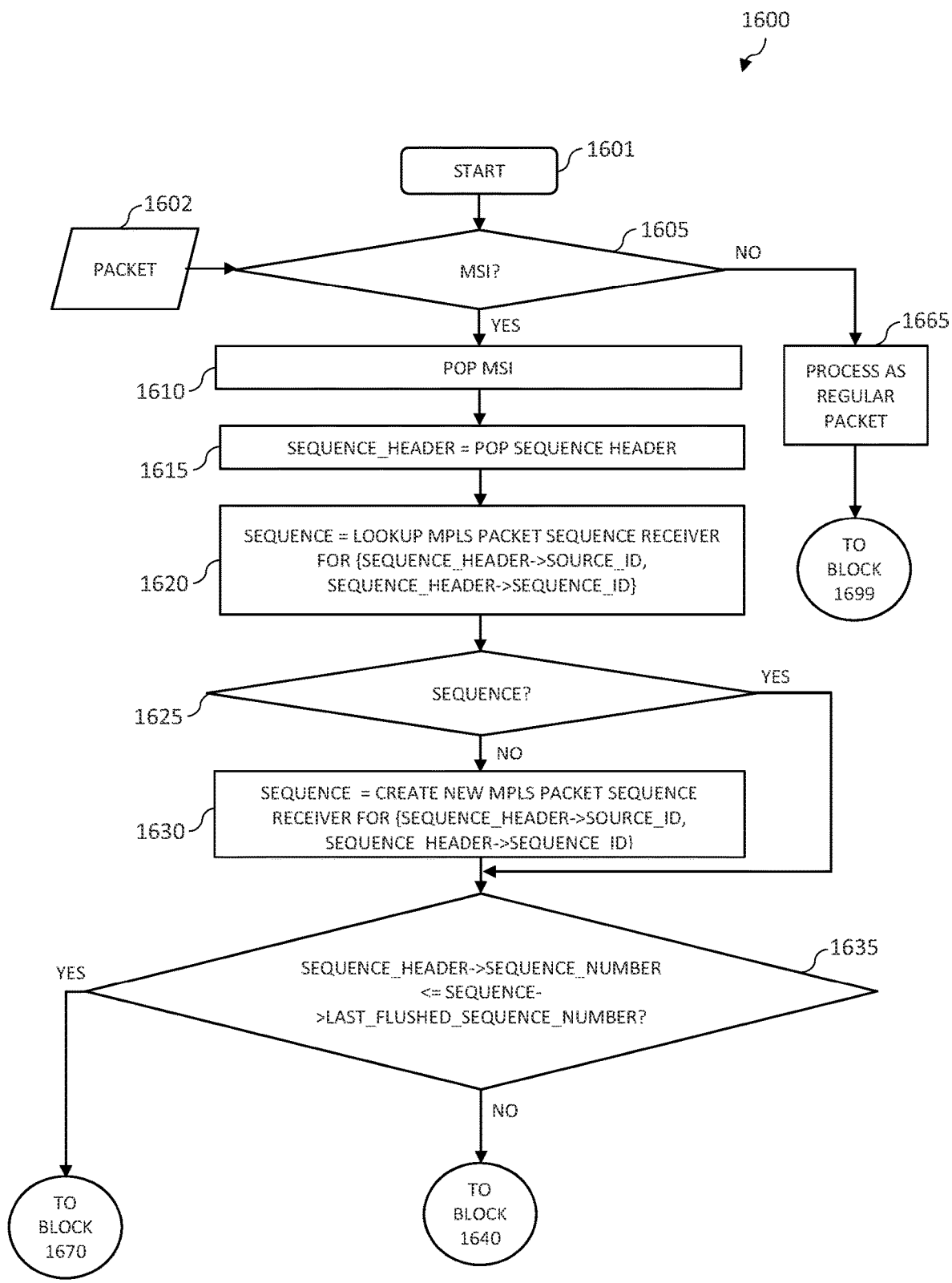
FIG. 16 depicts an example embodiment of a method for use by an egress node to process sequenced MPLS packets on an LSP.
Figure 16:
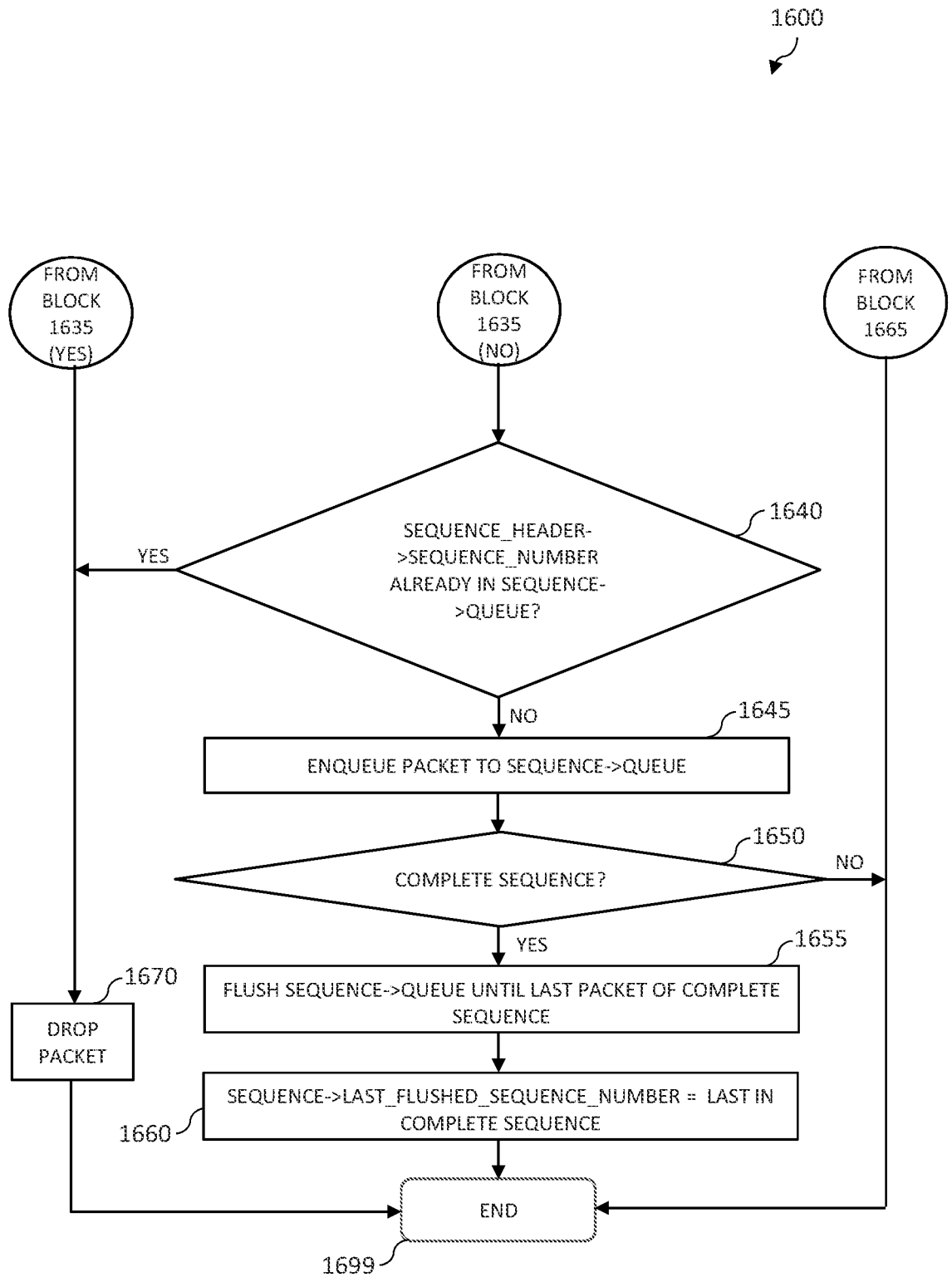

FIG. 16 depicts an example embodiment of a method for use by an egress node to process sequenced MPLS packets on an LSP. It is noted that, if the egress node is the termination point for multiple LSPs in a hierarchy then the method 1600 may be repeated for each LSP terminated at the egress node. At block 1601, the method 1600 begins. As indicated at block 1602, the input to the method 1600 includes a packet after removal of the LSP label stack. Block 1605 checks if there is an MSI label at the top of the packet. If there is an MSI label at the top of the packet then the method 1600 proceeds to block 1610, otherwise the method 1600 proceeds to step 1665. Block 1665 processes the packet in a typical manner (without use of MPLS sequencing) and the method 1600 then proceeds to block 1699, where the method 1600 ends. Block 1610 pops the MSI label from the packet, and the method 1600 then proceeds to block 1615. Block 1615 parses and pops the MPLS Sequence Header from the top of the packet, and the method 1600 then proceeds to block 1620. Block 1620 looks up the MPLS packet sequence that matches the {Source ID, Sequence ID} tuple from the Sequence Header, and the method 1600 then proceeds to block 1625. Block 1625 checks if the MPLS packet sequence is found. If the MPLS packet sequence is found then the method 1600 proceeds to block 1635, otherwise the method 1600 proceeds to block 1630. Block 1630 creates a new MPLS packet sequence for the {Source ID, Sequence ID} tuple from the Sequence Header, and the method 1600 then proceeds to block 1635. Block 1635 checks if the Sequence Number in the Sequence Header is less than or equal to the last_flushed_sequence_number of the MPLS packet sequence. If the Sequence Number in the Sequence Header is less than or equal to the last_flushed_sequence_number of the MPLS packet sequence then the method 1600 proceeds to block 1670, otherwise the method 1600 proceeds to block 1640. Block 1640 checks if the Sequence Number in the Sequence Header matches one of the packets in the queue of the MPLS packet sequence. If the Sequence Number in the Sequence Header matches one of the packets in the queue of the MPLS packet sequence then the method 1600 proceeds to block 1670, otherwise the method 1600 proceeds to block 1645. Block 1645 enqueues the packet into the queue of the MPLS packet sequence, and the method 1600 then proceeds to block 1650. Block 1670 drops the packet and the method 1600 then proceeds to block 1699, where the method 1600 ends. Block 1650 checks if the queue in the MPLS packet sequence has a complete sequence. If the queue in the MPLS packet sequence does not yet have a complete sequence then there is nothing more to do and the method 1600 proceeds to block 1699, where the method 1600 ends; otherwise, the method 1600 proceeds to block 1655. Block 1655 flushes all packets in the complete sequence, and the method 1600 then proceeds to block 1660. Block 1660 updates the last_flushed_sequence_number in the MPLS packet sequence as the sequence number of the packet that was the last to be flushed, and the method 1600 then proceeds to block 1699, where the method 1600 ends. At block 1699, the method 1600 ends.

It will be appreciated that the ingress node also may be configured to terminate an MPLS packet sequence. When the ingress node configures an independent MPLS packet sequence for each packet flow transported on an LSP, then there may be cases in which the ingress node may need to tear down the state of a packet flow while the LSP continues to operate. In that case, the ingress node needs to notify the egress node to tear down the MPLS packet sequence configuration at the egress node. This can be achieved by sending a packet on the LSP with a Sequence Header that encodes a particular Sequence Number that indicates to the egress node that MPLS packet sequence configuration at the egress node is to be torn down (e.g., setting the Sequence Number to 0 or any other suitable value). On receiving the indicator (e.g., Sequence Number=0 or other suitable value), the egress node tears down the MPLS packet sequence that matches the {Source ID, Sequence ID} tuple in the Sequence Header. It will be appreciated that this control packet sent by the ingress node and received by the egress node is not to be forwarded by the egress node to the non-MPLS domain. In at least some example embodiments, reliable delivery of this control packet may be ensured by sending the control packet multiple times (e.g., three times, five times, or the like) in certain periodic intervals. It will be appreciated that a copy of the control packet will be sent on each path of a multipath LSP.

Figure 17:
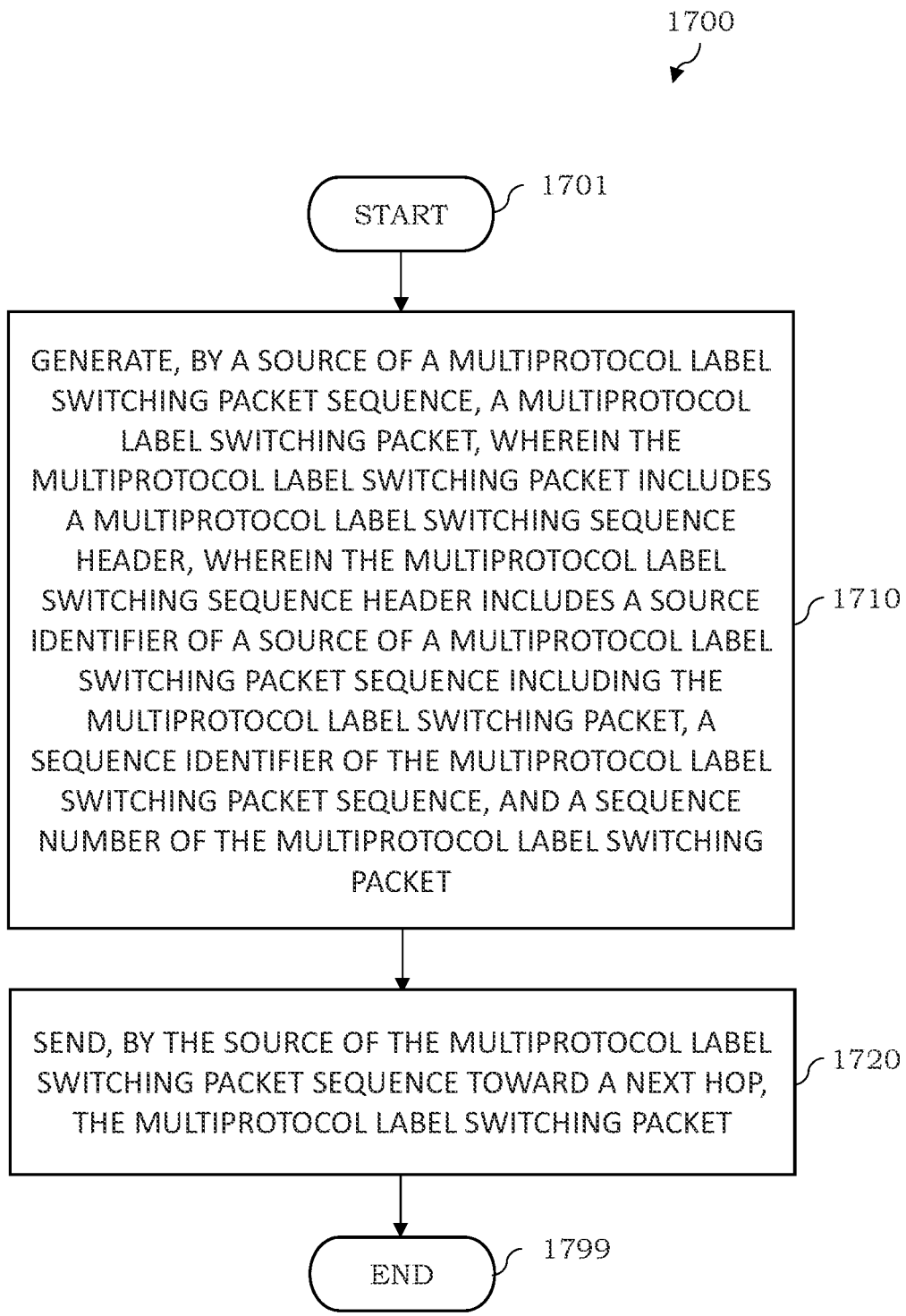
FIG. 17 depicts an example embodiment of a method for use by an ingress node for supporting sequencing of labeled packets.

FIG. 17 depicts an example embodiment of a method for use by an ingress node for supporting sequencing of labeled packets. At block 1701, the method 1700 begins. At block 1710, generate, by a source of a multiprotocol label switching packet sequence, a multiprotocol label switching packet, wherein the multiprotocol label switching packet includes a multiprotocol label switching sequence header, wherein the multiprotocol label switching sequence header includes a source identifier of a source of a multiprotocol label switching packet sequence including the multiprotocol label switching packet, a sequence identifier of the multiprotocol label switching packet sequence, and a sequence number of the multiprotocol label switching packet. At block 1720, send, by the source of the multiprotocol label switching packet sequence toward a next hop, the multiprotocol label switching packet. At block 1799, the method 1700 ends.

Figure 18:
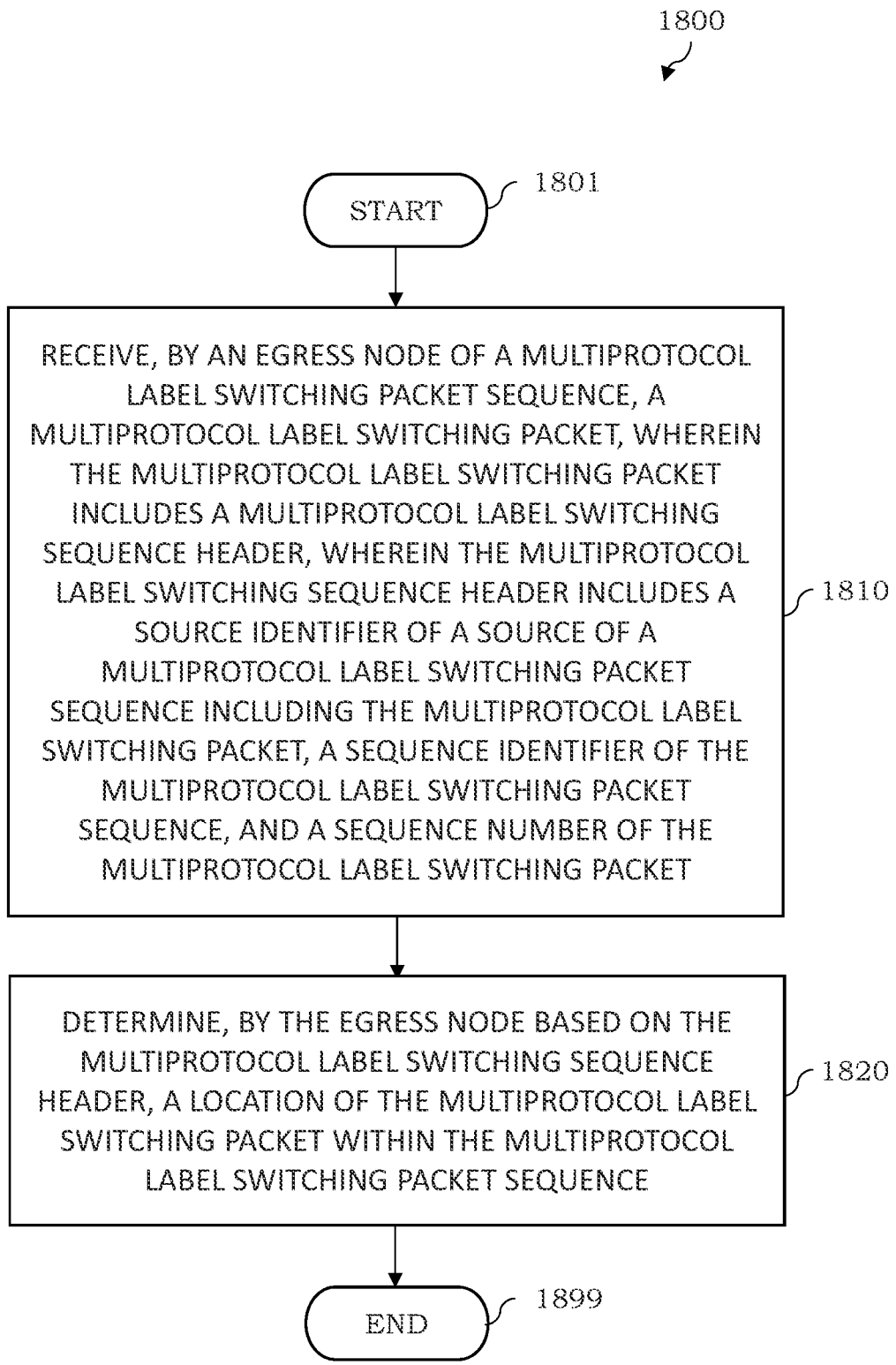
FIG. 18 depicts an example embodiment of a method for use by an egress node for supporting sequencing of labeled packets.

FIG. 18 depicts an example embodiment of a method for use by an egress node for supporting sequencing of labeled packets. At block 1801, the method 1800 begins. At block 1810, receive, by an egress node of a multiprotocol label switching packet sequence, a multiprotocol label switching packet, wherein the multiprotocol label switching packet includes a multiprotocol label switching sequence header, wherein the multiprotocol label switching sequence header includes a source identifier of a source of a multiprotocol label switching packet sequence including the multiprotocol label switching packet, a sequence identifier of the multiprotocol label switching packet sequence, and a sequence number of the multiprotocol label switching packet. At block 1820, determine, by the egress node based on the multiprotocol label switching sequence header, a location of the multiprotocol label switching packet within the multiprotocol label switching packet sequence. At block 1899, the method 1800 ends.

Figure 19:
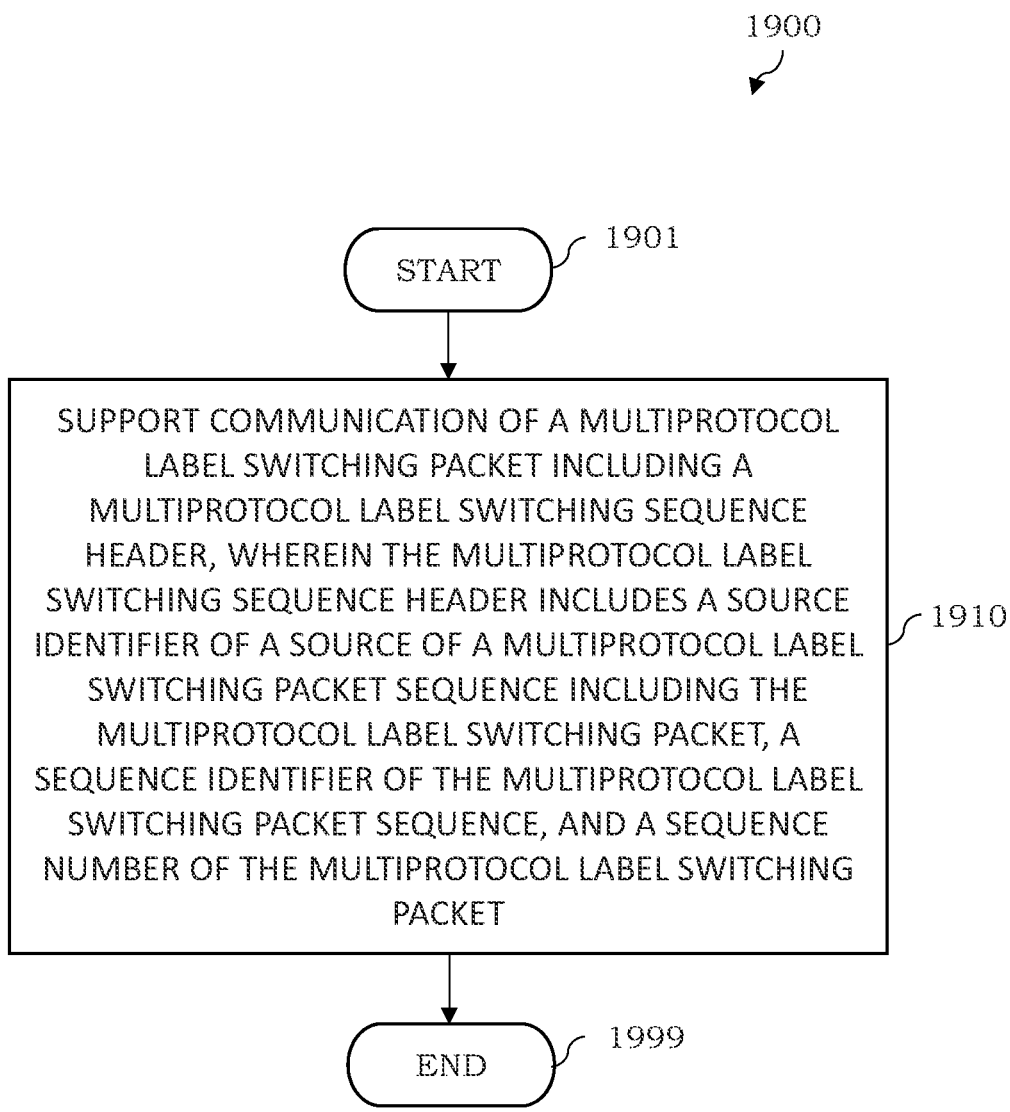
FIG. 19 depicts an example embodiment of a method for use by a node for supporting sequencing of labeled packets.

FIG. 19 depicts an example embodiment of a method for use by a node for supporting sequencing of labeled packets. At block 1901, the method 1900 begins. At block 1910, support communication of a multiprotocol label switching packet including a multiprotocol label switching sequence header, wherein the multiprotocol label switching sequence header includes a source identifier of a source of a multiprotocol label switching packet sequence including the multiprotocol label switching packet, a sequence identifier of the multiprotocol label switching packet sequence, and a sequence number of the multiprotocol label switching packet. At block 1999, the method 1900 ends.

Figure 20:
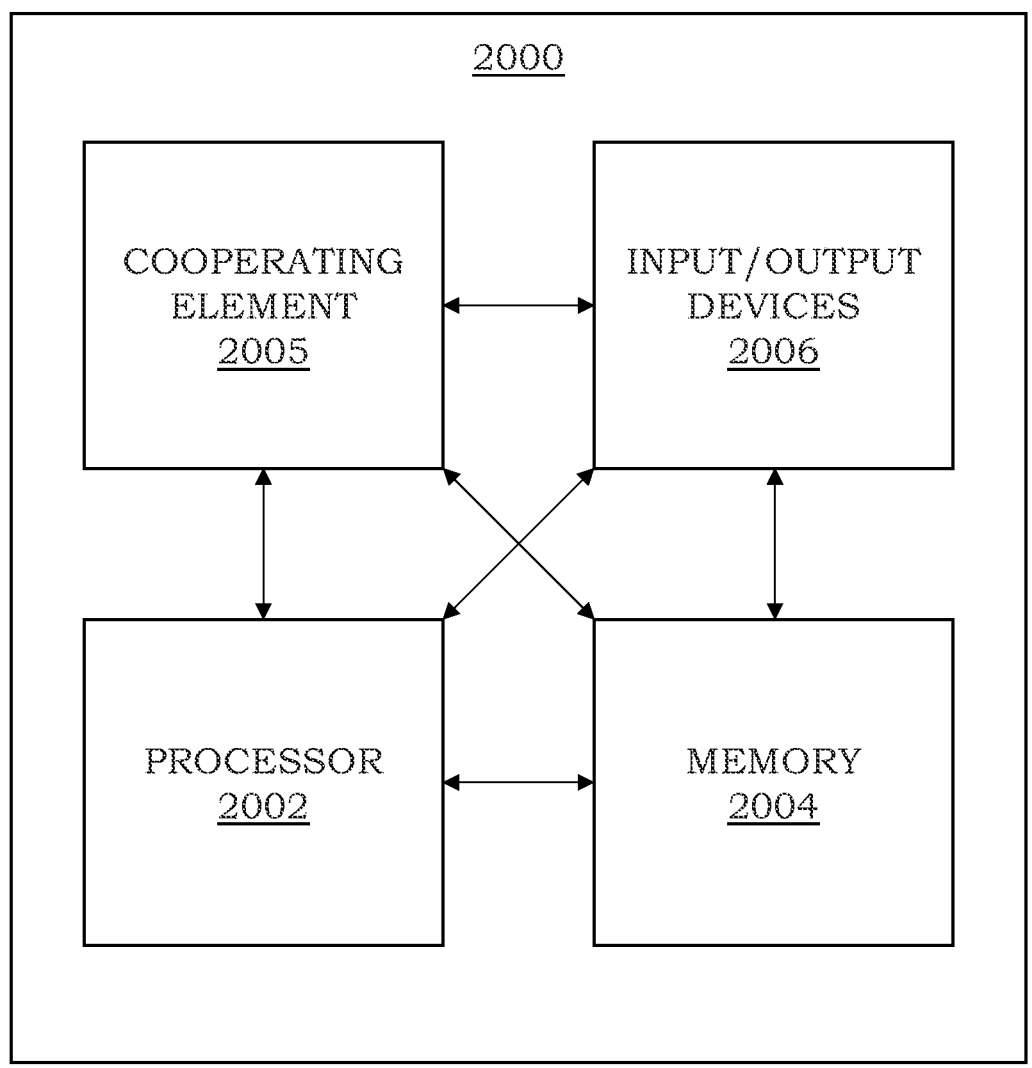
FIG. 20 depicts an example embodiment of a computer suitable for use in performing various functions presented herein.

FIG. 20 depicts an example embodiment of a computer suitable for use in performing various functions presented herein.

The computer 2000 includes a processor 2002 (e.g., a central processing unit (CPU), a processor, a processor having a set of processor cores, a processor core of a processor, or the like) and a memory 2004 (e.g., a random access memory, a read only memory, or the like). The processor 2002 and the memory 2004 may be communicatively connected. In at least some example embodiments, the computer 2000 may include at least one processor and at least one memory including computer program code, wherein the at least one memory and the computer program code are configured to, with the at least one processor, cause the computer to perform various functions presented herein.

The computer 2000 also may include a cooperating element 2005. The cooperating element 2005 may be a hardware device. The cooperating element 2005 may be a process that can be loaded into the memory 2004 and executed by the processor 2002 to implement various functions presented herein (in which case, for example, the cooperating element 2005 (including associated data structures) can be stored on a non-transitory computer-readable storage medium, such as a storage device or other suitable type of storage element (e.g., a magnetic drive, an optical drive, or the like)).

The computer 2000 also may include one or more input/output devices 2006. The input/output devices 2006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2000 may represent a general architecture and functionality suitable for implementing functional elements described herein, portions of functional elements described herein, or the like, as well as various combinations thereof. For example, computer 2000 may provide a general architecture and functionality that is suitable for implementing one or more elements presented herein, such as a node or a portion thereof, a controller or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions which, when executed by the at least one processor, cause the apparatus at least to:
   maintain, by an egress node of a multiprotocol label switching packet sequence, a queue for the multiprotocol label switching packet sequence and an indication of a maximum sequence number last flushed from the queue;
   receive, by the egress node, a multiprotocol label switching packet of the multiprotocol label switching packet sequence, wherein the multiprotocol label switching packet includes a multiprotocol label switching sequence header including a source identifier of a source of the multiprotocol label switching packet sequence, a sequence identifier of the multiprotocol label switching packet sequence, and a sequence number of the multiprotocol label switching packet configured to indicate a location of the multiprotocol label switching packet within the multiprotocol label switching packet sequence; and
   identify, by the egress node based on a determination that the sequence number of the multiprotocol label switching packet is less than the maximum sequence number last flushed from the queue, the multiprotocol label switching packet as being a duplicate packet of the multiprotocol label switching packet sequence.

2. The apparatus of claim 1, wherein a combination of the source identifier and the sequence identifier is configured to uniquely identify the multiprotocol label switching packet sequence within a network.

3. The apparatus of claim 1, wherein the source identifier of the source includes one of an internet protocol address or a media access control address.

4. The apparatus of claim 1, wherein the multiprotocol label switching sequence header is disposed between a payload of the multiprotocol label switching packet and label stack of the multiprotocol label switching packet.

5. The apparatus of claim 4, wherein the label stack of the multiprotocol label switching packet represents a multiprotocol label switching label switched path or a multiprotocol label switching point-to-multipoint label switched path.

6. The apparatus of claim 1, wherein the multiprotocol label switching sequence header is disposed between a first label stack of the multiprotocol label switching packet and a second label stack of the multiprotocol label switching packet.

7. The apparatus of claim 6, wherein the first label stack of the multiprotocol label switching packet is disposed above the multiprotocol label switching sequence header and the second label stack of the multiprotocol label switching packet is disposed below the multiprotocol label switching sequence header.

8. The apparatus of claim 6, wherein the first label stack of the multiprotocol label switching packet represents a multiprotocol label switching label switched path.

9. The apparatus of claim 8, wherein the second label stack of the multiprotocol label switching packet represents a virtual private network or a pseudowire.

10. The apparatus of claim 7, wherein the multiprotocol label switching sequence header includes a flag indicative of a presence of the second label stack of the multiprotocol label switching below the multiprotocol label switching sequence header.

11. The apparatus of claim 1, wherein the multiprotocol label switching packet includes a second multiprotocol label switching sequence header.

12. The apparatus of claim 11, wherein the multiprotocol label switching packet includes a first label stack associated with the multiprotocol label switching sequence header, wherein the multiprotocol label switching packet includes a second label stack associated with the second multiprotocol label switching sequence header.

13. The apparatus of claim 1, wherein the multiprotocol label switching sequence header is encapsulated by a sequence indicator label configured to indicate presence of the multiprotocol label switching sequence header in the multiprotocol label switching packet.

\* \* \* \* \*